US008204380B2

(12) United States Patent
Ozaki

(10) Patent No.: US 8,204,380 B2
(45) Date of Patent: *Jun. 19, 2012

(54) BANDWIDTH ALLOCATION METHOD, OPTICAL LINE TERMINATOR, SUBSCRIBER STATION, COMMUNICATION SYSTEM, AND RECORDING MEDIUM RECORDING PROGRAM OF DEVICE

(75) Inventor: Hirokazu Ozaki, Tokyo (JP)

(73) Assignee: NEC Corporation, Tokyo (JP)

( * ) Notice: Subject to any disclaimer, the term of this patent is extended or adjusted under 35 U.S.C. 154(b) by 674 days.

This patent is subject to a terminal disclaimer.

(21) Appl. No.: 12/389,690

(22) Filed: Feb. 20, 2009

(65) Prior Publication Data

US 2009/0214206 A1 Aug. 27, 2009

(30) Foreign Application Priority Data

Feb. 22, 2008 (JP) ................................. 2008-041027

(51) Int. Cl.
*H04J 14/08* (2006.01)
(52) U.S. Cl. ....................................................... 398/100
(58) Field of Classification Search .................... 398/100
See application file for complete search history.

(56) References Cited

U.S. PATENT DOCUMENTS 7,362,704 B2 * 4/2008 Sisto et al. .................... 370/230

FOREIGN PATENT DOCUMENTS

JP 2005064783 A 3/2005

OTHER PUBLICATIONS

A. Hadjiantonis et al., "A Novel Decentralized Ethernet-Based Passive Optical Network Architecture", IEEE, 2004.*
A. Hossain et al., "A Distributed Control Plane Architecture for EPON: Simulation Study and Feasibility experiment", The Second International Conference on Innovations in Information Technology, 2005.*
G. Shen et al., "Fixed Mobile Convergence Architectures for Broadband Access: Integration of EPON and WiMAX" IEEE Communications Magazine, Aug. 2007, pp. 44-50.

* cited by examiner

*Primary Examiner* — Shi K Li

(57) ABSTRACT

An exemplary object of the present invention is to accurately reflect allocation requests and increase the bandwidth use efficiency without requiring expensive and fast integrated circuits or CPUs in the control unit even in a large-scale system with a large number of terminal devices. A subscriber station comprises allocating means for determining bandwidth allocation based on a predetermined allocation condition and bandwidth transmitting means for transmitting bandwidth allocation information determined by the allocating means to an optical line terminator. The optical line terminator comprises pipeline transmitting means for transmitting bandwidth allocation information transmitted from the subscriber stations to all subscriber stations to be allocated with bandwidth.

9 Claims, 25 Drawing Sheets

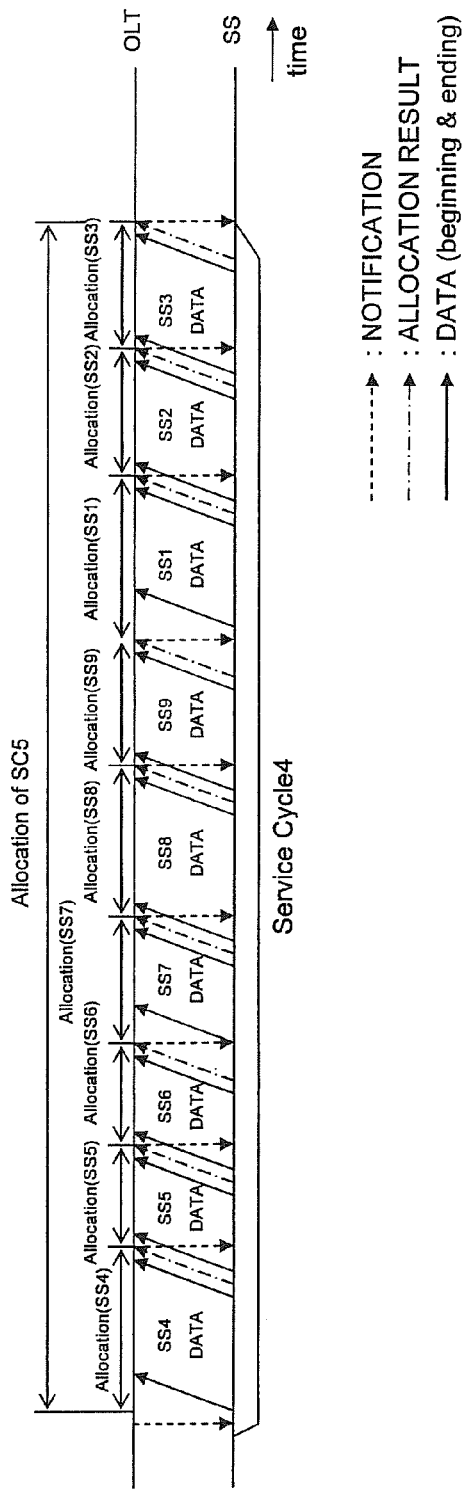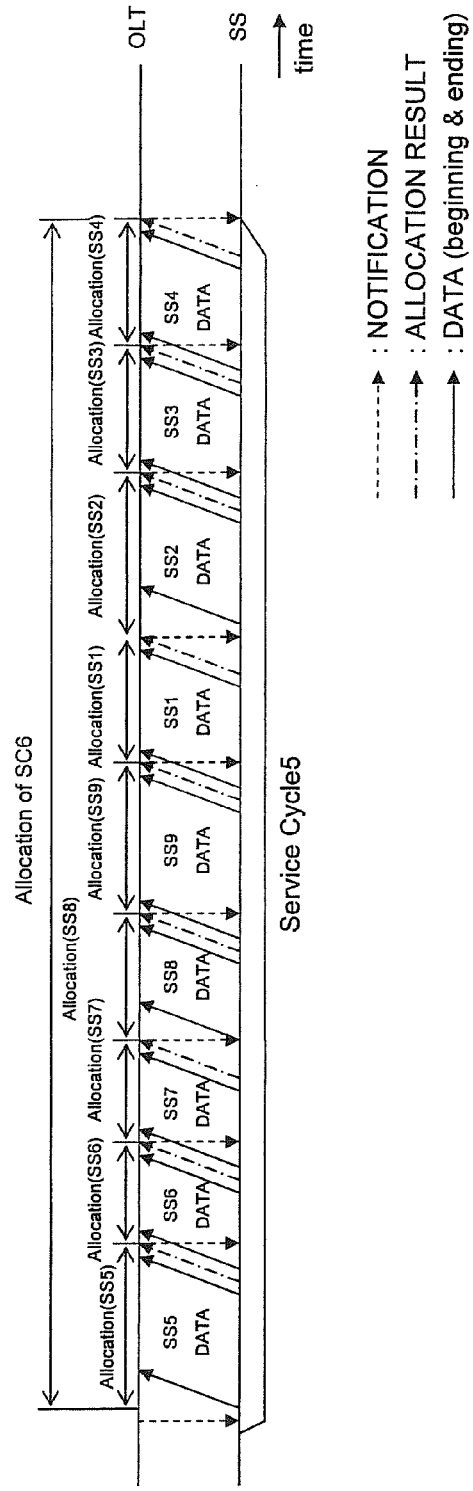

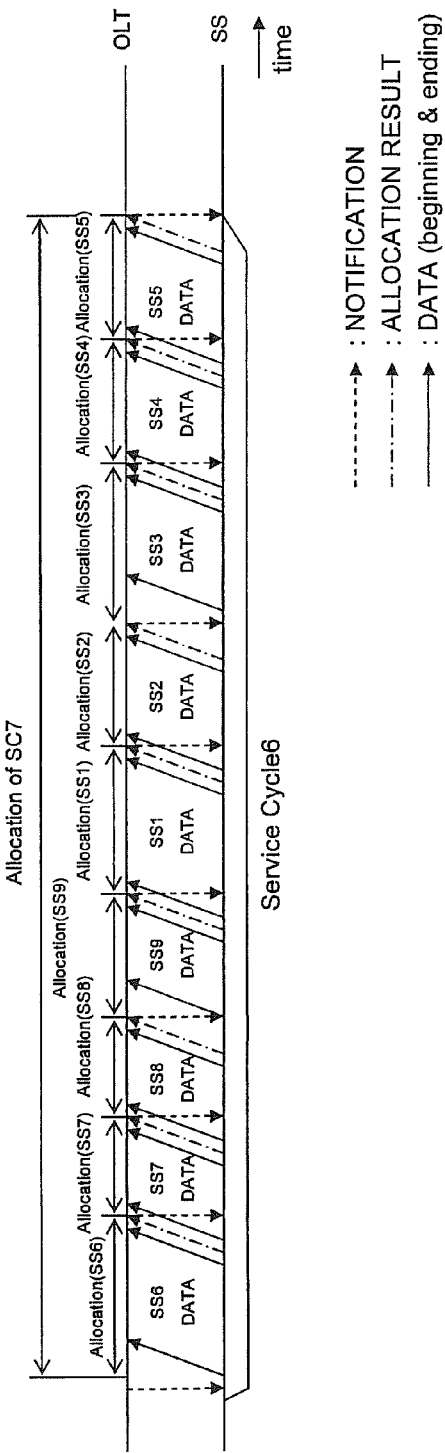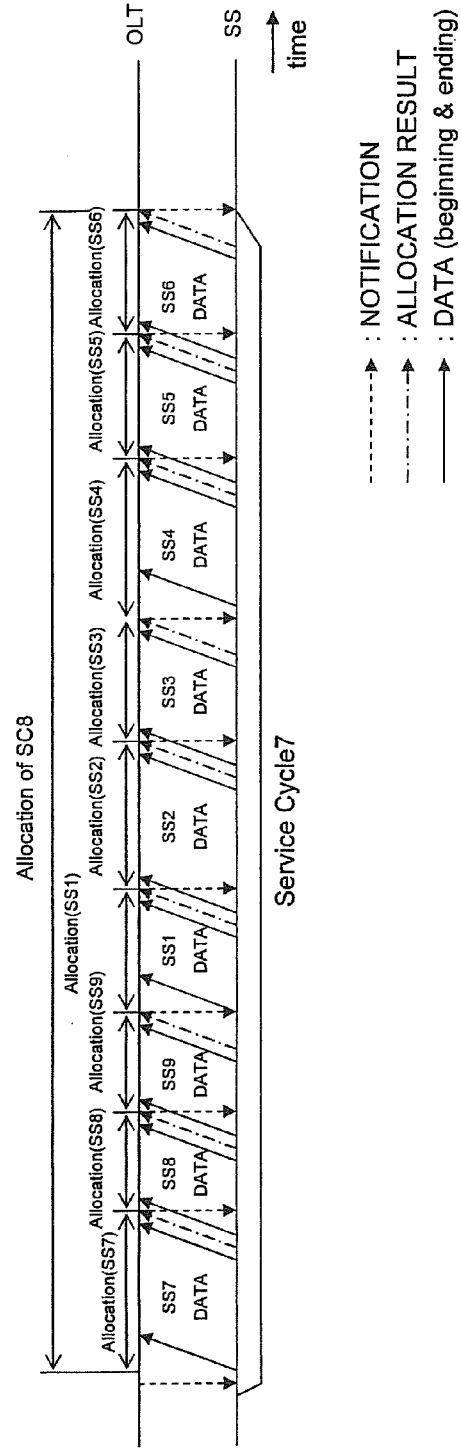

BANDWIDTH ALLOCATION METHOD, OPTICAL LINE TERMINATOR, SUBSCRIBER STATION, COMMUNICATION SYSTEM, AND RECORDING MEDIUM RECORDING PROGRAM OF DEVICE

This application is based upon and claims the benefit of priority from Japanese patent application No. 2008-041027, filed on Feb. 22, 2008, the disclosure of which is incorporated herein in its entirety by reference.

BACKGROUND OF THE INVENTION

1. Field of the Invention

The present invention relates to a bandwidth allocation method, an optical line terminator, a subscriber station, a communication system, and a recording medium recording a program of a device in a system, such as Passive Optical Network (hereinafter "PON"), in which a plurality of devices are connected to the optical line terminator.

2. Description of Related Art

In recent years, the broadband of access lines has progressed as a result of the rapid spread of the Internet. Examples of existing broadband access lines include various systems such as ADSL and cable modems. The PON is promising worldwide for wider bandwidth.

Meanwhile, the Worldwide Interoperability for Microwave Access (hereinafter "WiMAX") is attracting attention as a broadband wireless communication system in regions where the installation of metal lines or optical fibers is difficult. Recently, the Fixed Mobile Convergence (FMC) has been proposed to simplify the system and reduce the cost, and a network for connecting the WiMAX to the subscribers of PON has been proposed (see Non-Patent Document 1 (Gangxiang Shen et. al., "Fixed Mobile Convergence Architectures for Broadband Access: Integration of EPON and WiMAX", IEEE Communications Magazine August 2007, pp. 44-50)).

FIG. 1 shows a general configuration of the PON. ONUs (optical network unit) are installed in end users' houses, and an OLT (optical line terminator) is installed at a station. The ONUs and OLT are connected by optical fibers and an optical splitter. The personal computers of the users are connected to the network through the ONUs and further connected to superior networks and the Internet through the OLT.

As uplink signals (wavelength is usually 1.3 μm) and downlink signals (wavelength is usually 1.5 μm) are wavelength-multiplexed, the devices are connected by interactive single-core optical fibers. The downlink signals are broadcasted from the OLT to all ONUs, and each ONU checks the address of the frame and imports the frame addressed to the ONU.

The uplink signals from the ONUs merge at the optical splitter, and time-division multiplexing is used to avoid collision of the signals. Therefore, the OLT adjusts output requests (REPORT) momentarily reported from the ONUs and provides signal transmission permissions (GATE) to the ONUs after calculating the transmission time based on the distances between the OLT and the ONUs.

The output request (REPORT) includes information of queue status (length of queue) of buffers. The signal transmission permission (GATE) includes transmission start time and transmission duration time for each priority of signals, and the ONUs transmit the uplink signals according to the times. Thus, the uplink bandwidth allocation is realized by allocation of time slots. FIGS. 2 and 3 show flows of signals in which three ONUs are connected. FIG. 2 shows downlink signals, while FIG. 3 shows uplink signals. Rectangles with numbers denote frames of ONU-addressed signals and ONU-departed signals.

FIG. 4 shows a time relationship of an output request signal (REPORT), an output enable signal (GATE), and an uplink data signal (DATA) exchanged between the ONU and the OLT. FIG. 4 shows a signal exchanged between one ONU and one OLT. In FIG. 4, t1 and t5 denote transmission time of REPORT, t2 and t4 denote arrival time of GATE, Waiting Time denotes waiting time until signal transmission, and Time Slot denotes a time slot of data transmission. In many cases, REPORT is transmitted at the end of DATA by piggy back. In that case, t4=t5.

FIG. 5 shows a time relationship of signals exchanged between three ONUs (ONU1, ONU2, and ONU3) and the OLT. A cycle in which uplink signal transmissions of all ONUs are performed will be called a Service Cycle. The length of the service cycle is usually not constant and is often dynamically changed according to the output requests from the ONUs.

Ethernet (registered trademark) and PON are standardized by IEEE802.3ah, wherein frame formats of a REPORT message and a GATE message are defined. However, uplink bandwidth allocation methods or algorithms are not defined and are left up to the installation of devices.

FIG. 6 shows a system configuration of WiMAX. BS and SS are respectively called a Base Station (or master station) and a Subscriber Station (or substation). The former is installed at the service provider, and the latter is installed at the user's house. The base station device BS and the subscriber station SS are wirelessly connected, and services such as connecting the Internet are provided to the subscriber.

The specifications for WiMAX are defined by IEEE802.16 series. Although there are various kinds of frequency bands and modulation methods in the physical layer, the MAC layer is shared. The uplink signals and the downlink signals are switched in a time-division manner, and a plurality of SS signals (uplink and downlink) are also multiplexed in a time-division manner.

As in the PON, the downlink signals are broadcasted from the BS to all SSs, and each SS checks the address of the frame and imports the frame addressed to the SS. The uplink signals are also basically the same as in the PON, and the BS adjusts bandwidth allocation requests from the SSs and returns allocation results to the SSs.

In general, an allocation module (hereinafter "AM" in Description and Figs.) mounted on the OLT intensively allocates the uplink bandwidth of PON based on the requests from the ONUs. An allocation module (AM) mounted on the BS also intensively allocates the uplink bandwidth of WiMAX based on the requests from the SSs.

The biggest difference between the systems of Ethernet PON (hereinafter "EPON") and WiMAX is that the former is a connectionless communication system, while the latter is a connection communication system. Thus, in relation to the bandwidth allocation requests, EPON is queue class based, while WiMAX is connection based.

FIG. 7 shows a configuration of a network in which EPON and WiMAX are integrated. WiMAX is arranged under the ONUs of the PON. The ONU and the BS are integrated as an optical network base unit. The optical network base unit will be called an ONU-BS.

An example of a related art by the present applicant includes a technique in which an access point is wirelessly connected to a mobile terminal, an access line connecting device allows the mobile terminal to access the Internet, and packets are routed, the routing unlinked with the access to the Internet by the subscriber (see, for example, Japanese Patent Laid Open Publication No. 2005-64783).

Problems of the conventional techniques will now be described.

In the network in which WiMAX and EPON are connected, the ONU-BS needs to convert an uplink bandwidth allocation request of WiMAX to a request of EPON.

As described, the compatibility between the queue class base of the EPON and the connection base is low. Therefore, efficient and accurate reflection of the requests of distal SSs in the bandwidth allocation by the OLT is difficult.

Furthermore, as the numbers of the SSs and the ONUs increase, the load of the bandwidth allocation processing by the BSs and the OLT increases, resulting in a problem of scalability. More specifically, the allocation requests are gathered from all SSs or ONUs in the conventional allocation system, and the control circuit then intensively performs allocation until the next service cycle starts. Therefore, an excessive load is imposed on the control circuit when a large number of SSs or ONUs exist. Thus, expensive and fast integrated circuits or CPUs are required for the control circuit in large-scale WiMAX or PON, which may lead to an increased cost of the system. Furthermore, if a plenty of calculation time is allowed, the start of the service cycle is delayed and the bandwidth is wasted, causing degradation of performance.

For efficient and highly accurate reflection of the requests of distal SSs, there is a method, as shown in FIG. 8, of transmitting the requests of the SSs to the OLT as it is, and the OLT intensively performs allocation. However, with the configuration, there is a problem that the load of processing by the OLT is significantly increased.

Furthermore, the technique in Japanese Patent Laid Open Publication No. 2005-64783 attempts to provide a public Internet connection service to a wide area. The technique is not designed not to require expensive and fast integrated circuits or CPUs in the control circuit even in a large-scale system with a large number of terminal devices.

SUMMARY

The present invention has been made to solve the problems. An exemplary object of the present invention is to provide a bandwidth allocation method, an optical line terminator, a subscriber station, a communication system, and a recording medium recording a program of a device capable of accurately reflecting allocation requests and increasing the bandwidth use efficiency without requiring expensive and fast integrated circuits or CPUs in the control circuit even in a large-scale system with a large number of terminal devices.

To attain the object, an exemplary aspect in accordance with the present invention provides a bandwidth allocation method including: an allocating step for a subscriber station to determine bandwidth allocation based on a predetermined allocation condition; a bandwidth transmitting step for the subscriber station to transmit bandwidth allocation information determined in the allocating step to an optical line terminator; and a pipeline transmitting step for the optical line terminator to transmit the bandwidth allocation information transmitted from the subscriber station to all subscriber stations to be allocated with bandwidth.

An exemplary aspect in accordance with the present invention provides a subscriber device including: an allocating unit that determines bandwidth allocation based on a predetermined allocation condition; and a bandwidth transmitting unit that transmits bandwidth allocation information determined by the allocating unit to an optical line terminator.

An exemplary aspect in accordance with the present invention provides an optical line terminator to which a plurality of subscriber stations are connected through an optical network base unit, the optical line terminator including a pipeline transmitting unit that transmits bandwidth allocation information transmitted from the subscriber station to all subscriber stations to be allocated with bandwidth.

An exemplary aspect in accordance with the present invention provides a communication system in which the subscriber station according to the present invention is connected to an optical network base unit by wireless communication, and the optical network base unit is connected to the optical line terminator according to the present invention through an optical splitter.

An exemplary aspect in accordance with the present invention provides a recording medium recording a program of a subscriber station, the program causing a computer of the subscriber station to execute: an allocation process of determining bandwidth allocation based on a predetermined allocation condition; and a bandwidth transmission process of transmitting bandwidth allocation information determined in the allocation process to an optical line terminator.

An exemplary aspect in accordance with the present invention provides a recording medium recording a program of an optical line terminator to which a plurality of subscriber stations are connected through an optical network base unit, the program causing a computer of the optical line terminator to execute a pipeline transmission process of transmitting bandwidth allocation information transmitted from the subscriber station to all subscriber stations to be allocated with bandwidth.

BRIEF DESCRIPTION OF THE DRAWINGS

The exemplary objects and features of the present invention will become more apparent from the consideration of the following detailed description taken in conjunction with the accompanying drawings, in which:

FIG. 16 shows an operation example of an SC4 in bandwidth allocation in the exemplary embodiment;

FIG. 17 shows an operation example of an SC5 in bandwidth allocation in the exemplary embodiment;

FIG. 18 shows an operation example of an SC6 in bandwidth allocation in the exemplary embodiment;

FIG. 19 shows an operation example of an SC7 in bandwidth allocation in the exemplary embodiment;

DESCRIPTION OF THE EXEMPLARY EMBODIMENTS

An exemplary embodiment applying a bandwidth allocation method, an optical line terminator, a subscriber station, a communication system, and a recording medium recording a program of a device according to the present invention will now be described in detail with reference to the drawings.

An outline of the exemplary embodiment will be described first.

Figure 1:
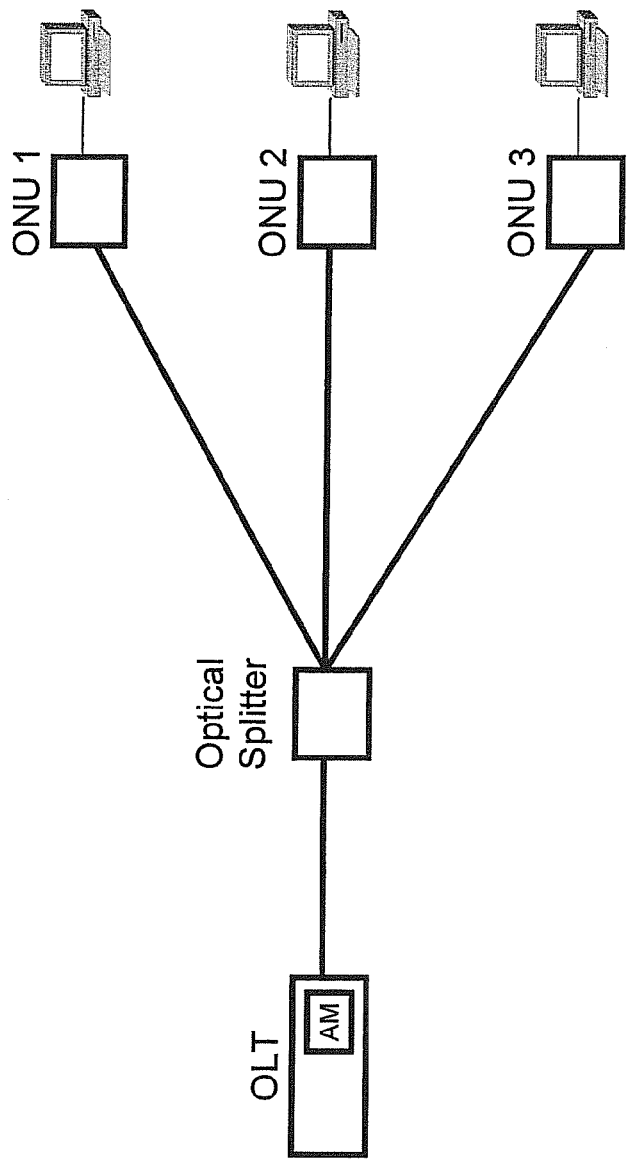
FIG. 1 is a block diagram of a configuration of a general PON.
Figure 2:
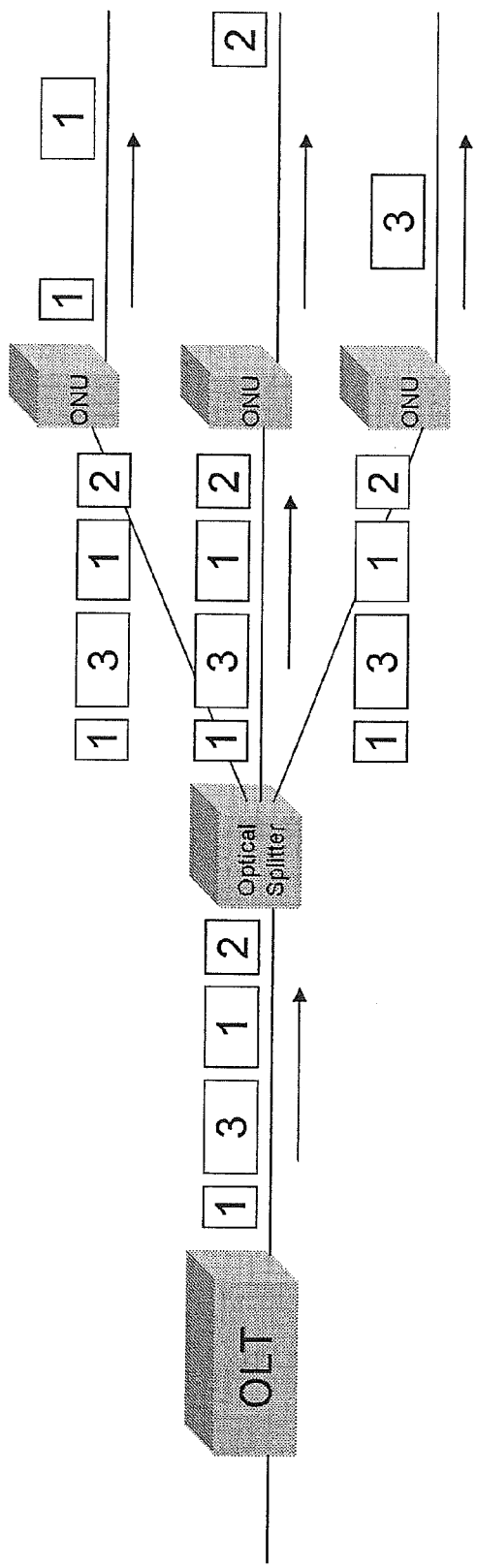
FIG. 2 is a block diagram of a mechanism of a configuration of the general PON and downlink signals.
Figure 3:
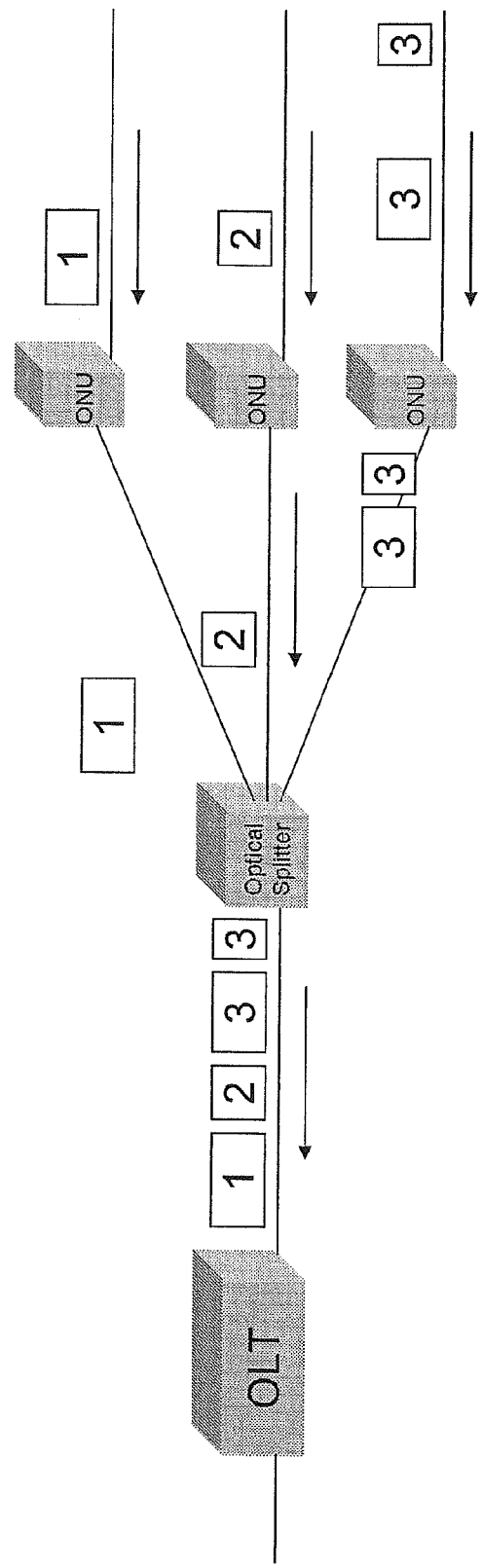
FIG. 3 is a block diagram of a mechanism of a configuration of the general PON and uplink signals.
Figure 4:
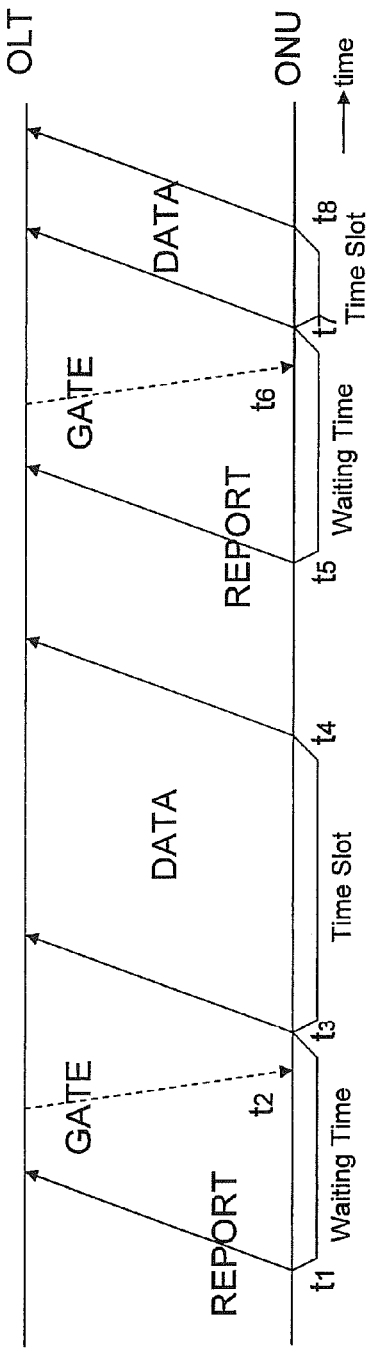
FIG. 4 shows a time relationship between signals exchanged between general ONU and OLT.
Figure 5:
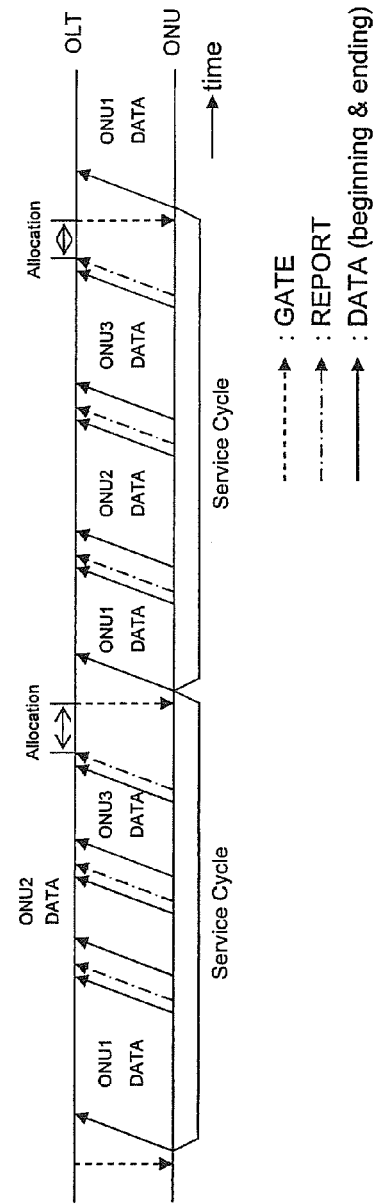
FIG. 5 shows a time relationship between signals exchanged between three general ONUs and an OLT.
Figure 6:
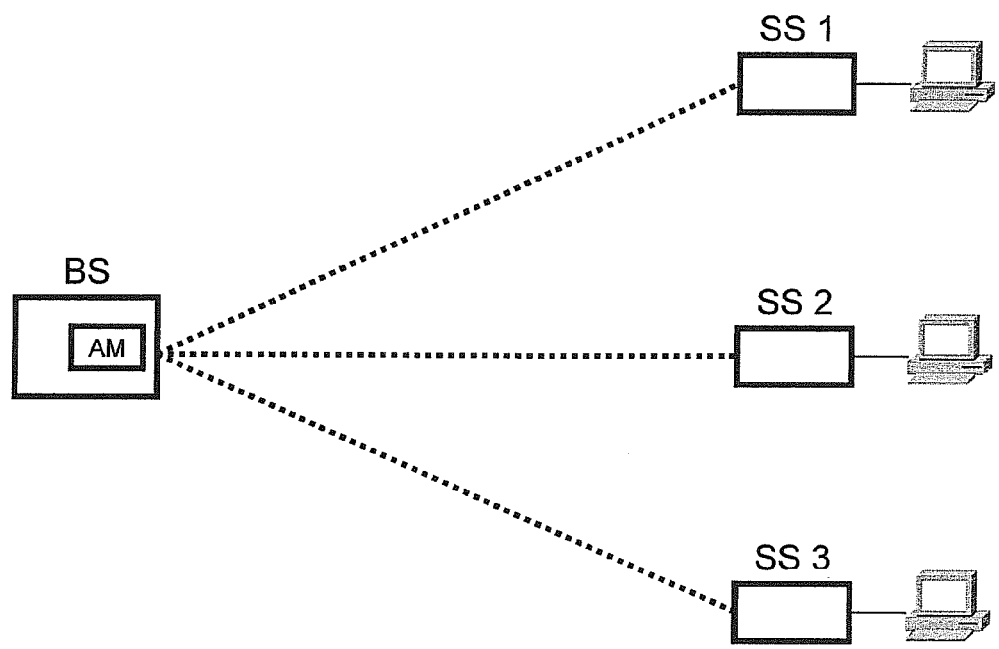
FIG. 6 is a block diagram of a system configuration of general WiMAX.
Figure 7:
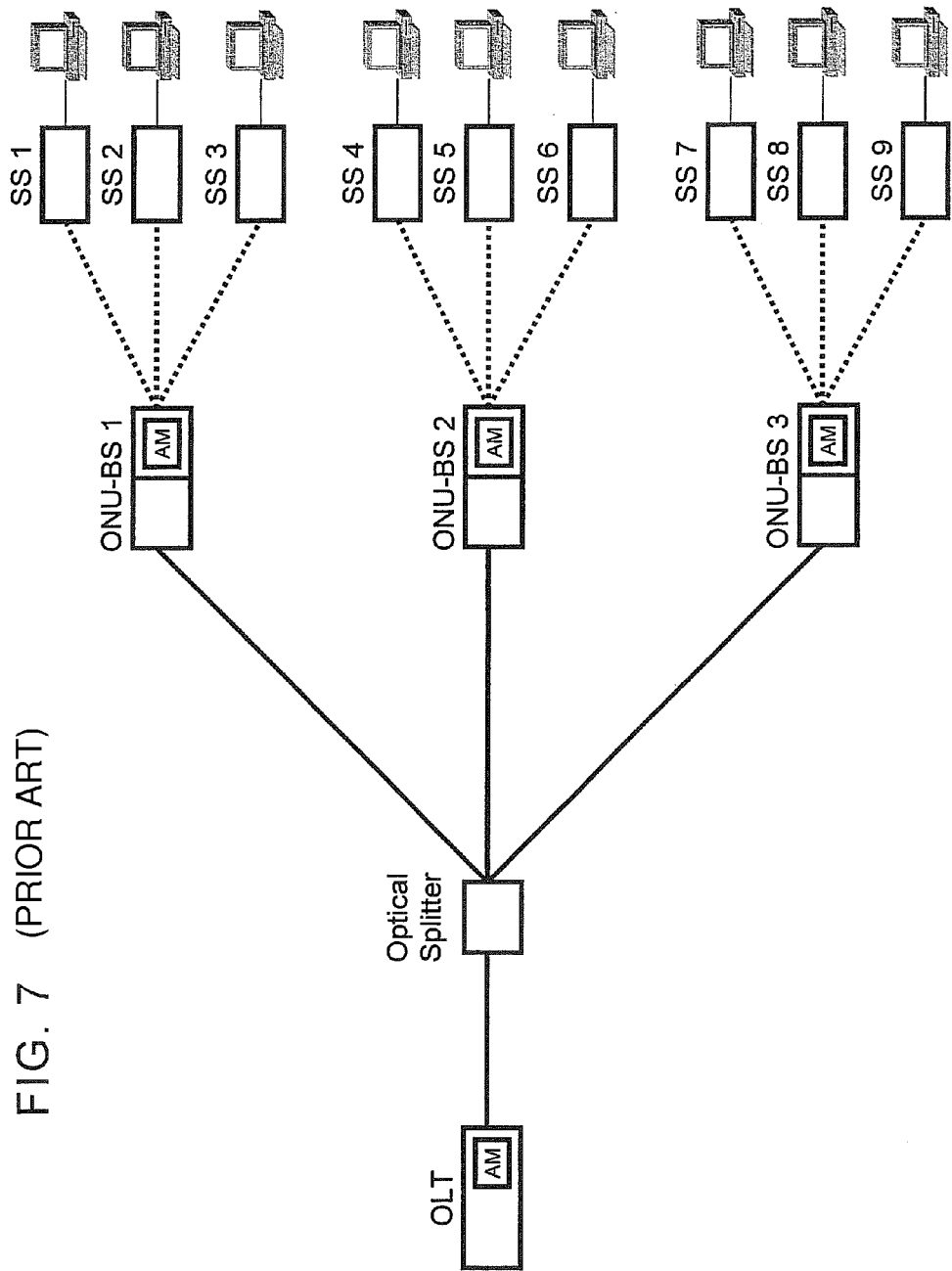
FIG. 7 is a block diagram of a configuration of a network in which general EPON and WiMAX are integrated.
Figure 8:
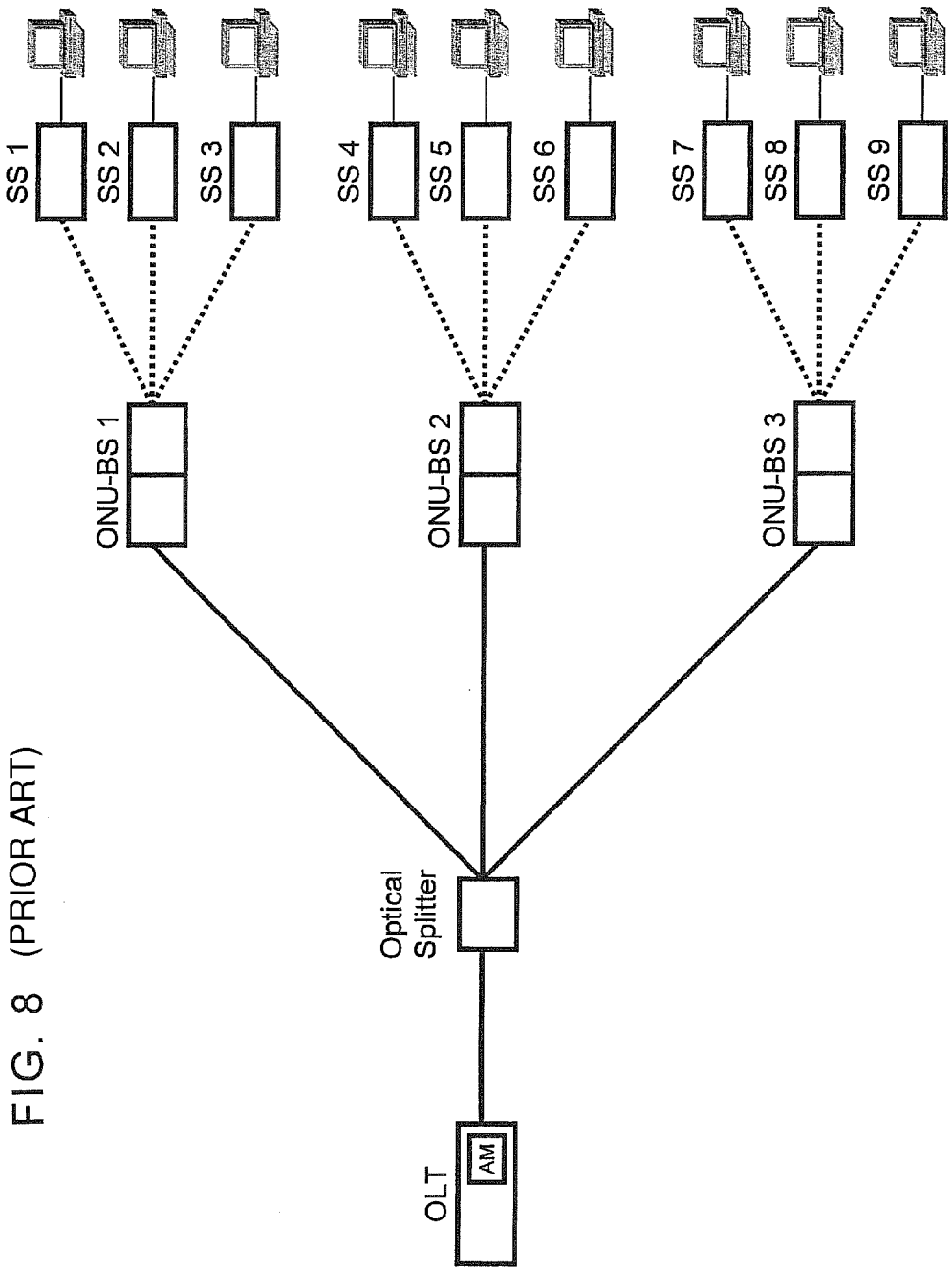
FIG. 8 is a block diagram of a general system configuration of intensive allocation by the OLT.
Figure 9:
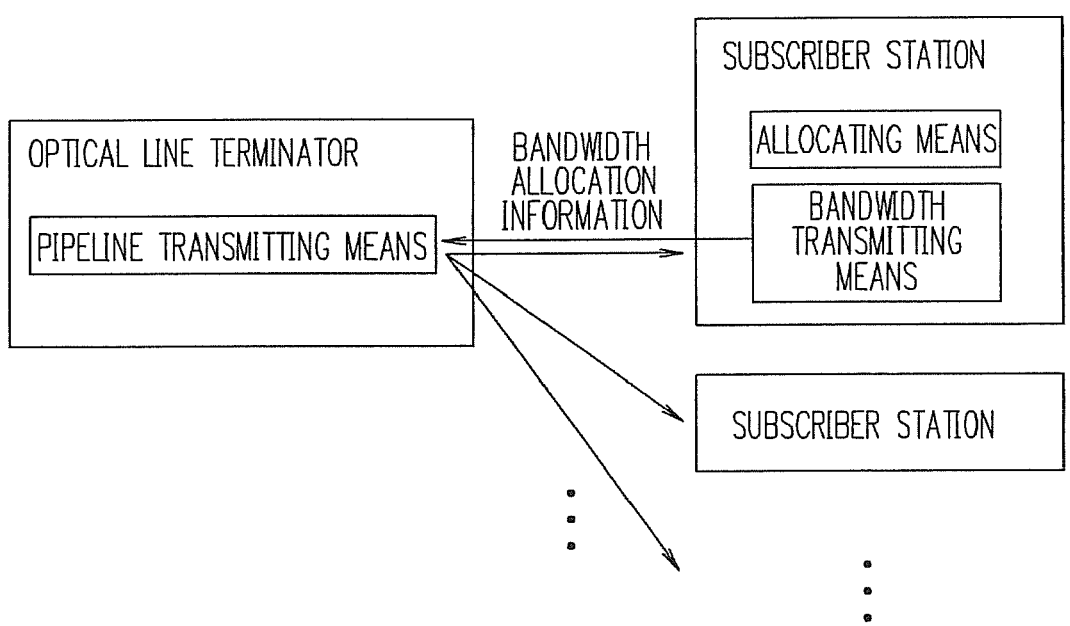
FIG. 9 shows an outline of an exemplary embodiment of the present invention.

In the exemplary embodiment, as shown in FIG. 9, a subscriber station comprises allocating means for determining bandwidth allocation based on a predetermined allocation condition and bandwidth transmitting means for transmitting bandwidth allocation information determined by the allocating means to an optical line terminator. The optical line terminator comprises pipeline transmitting means for transmitting the bandwidth allocation information transmitted from the subscriber station to all subscriber stations to be allocated with bandwidth.

With such a configuration, the exemplary embodiment disperses and arranges uplink allocation modules in subscriber stations (SS) in an access network in which PON and WiMAX are integrated, and introduces pipeline processing. In this way, the exemplary embodiment provides a fair bandwidth allocation method in which the processing load of a PON optical line terminator and a PON optical network unit/WiMAX base station device ONU-BS is reduced, the bandwidth use efficiency is high, bandwidth allocation requests are accurately reflected on allocation results, and the scalability is high.

A configuration of the exemplary embodiment will now be described.

Figure 10:
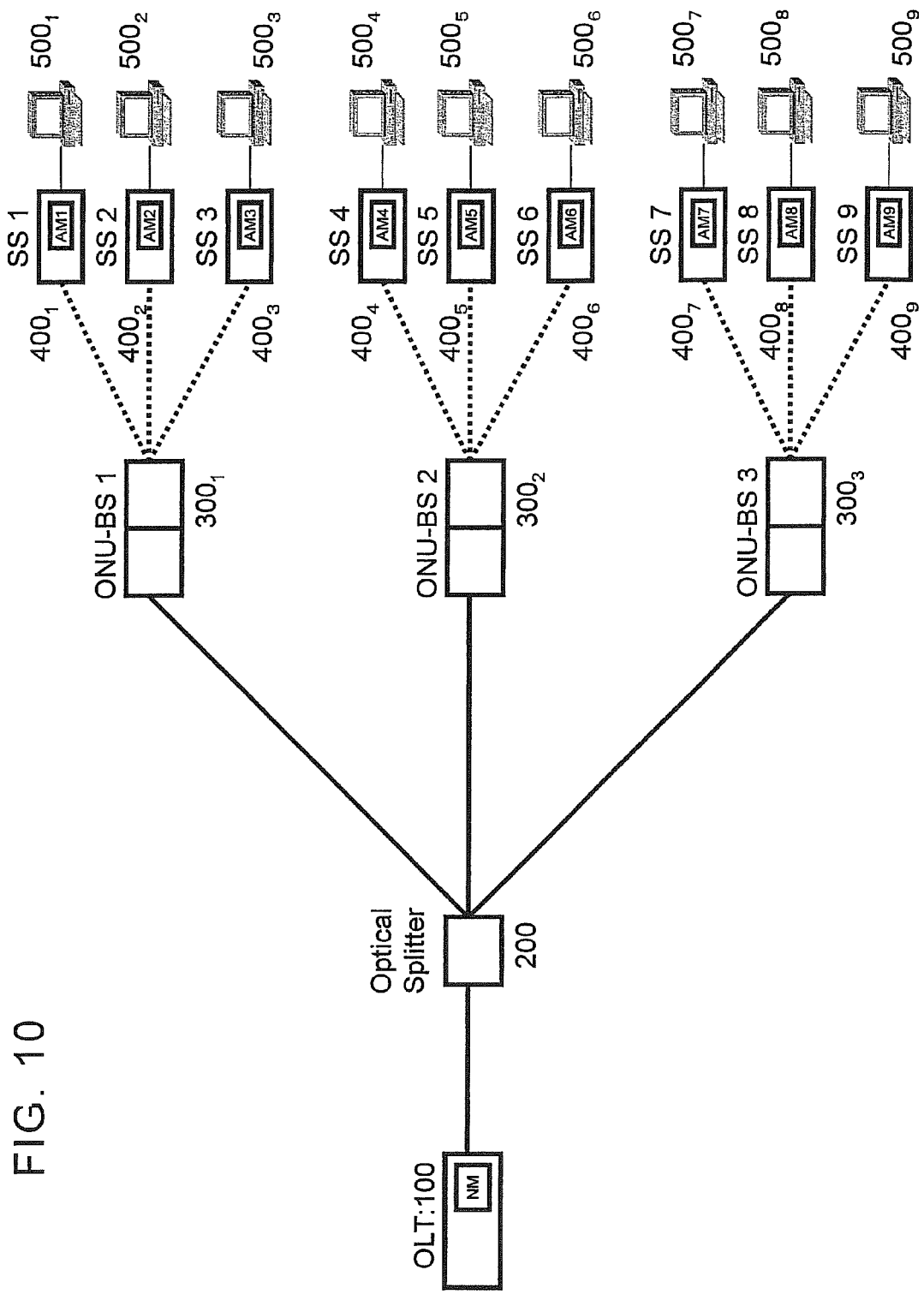
FIG. 10 is a block diagram of a configuration example of a communication system of the exemplary embodiment.

FIG. 10 shows a configuration of the exemplary embodiment. FIG. 10 shows a function arrangement in which three subscriber stations (SS) are arranged in each ONU-BS.

General configuration and system of the access network constituted by the PON and WiMAX are described as a background art. The exemplary embodiment disperses and arranges an allocation module (AM), which has been arranged in an optical line terminator (OLT) and a WiMAX base station device in the related technique, in each subscriber station (SS1 to ONU9). Therefore, the allocation results are reported to the OLT with uplink signals in the exemplary embodiment.

Queue buffers of the uplink signals are mounted only on the SSs and are not mounted on the OLT-BSS. In the OLT-BSS, devices are configured such that only fixed delays occur in association with signal conversion. The OLT comprises an NM (notification module) as a function for notifying an allocation result determined by each SS to all SSs.

In the communication system of the exemplary embodiment, ONU-BSs 300 are connected to an OLT 100 through an optical splitter 200, as shown in FIG. 10. SSs 400 are connected to the ONU-BSs 300 through wireless communication, and terminal devices 500 are connected to the SSs 400.

Figure 11:
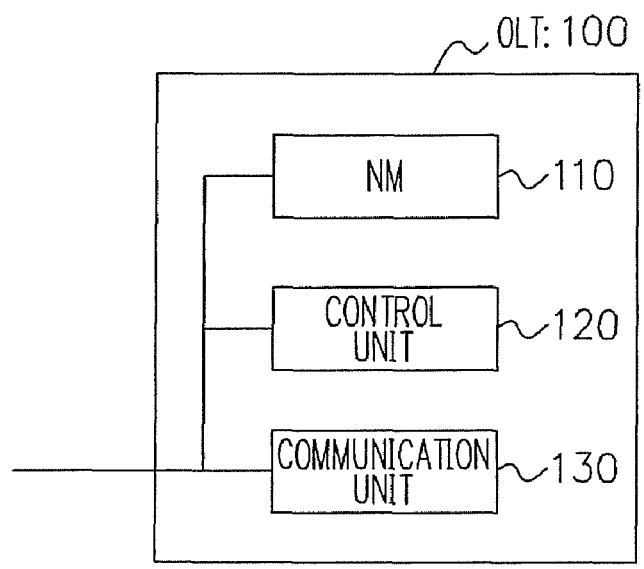
FIG. 11 is a block diagram of a configuration example of an OLT 100.

As shown in FIG. 11, the OLT 100 comprises an NM (pipeline transmitting means) 110 described above, a control unit 120 that performs control of the entire device such as control of communication with the ONUs, and a communication unit 130 that is a communication IF (interface).

Figure 12:
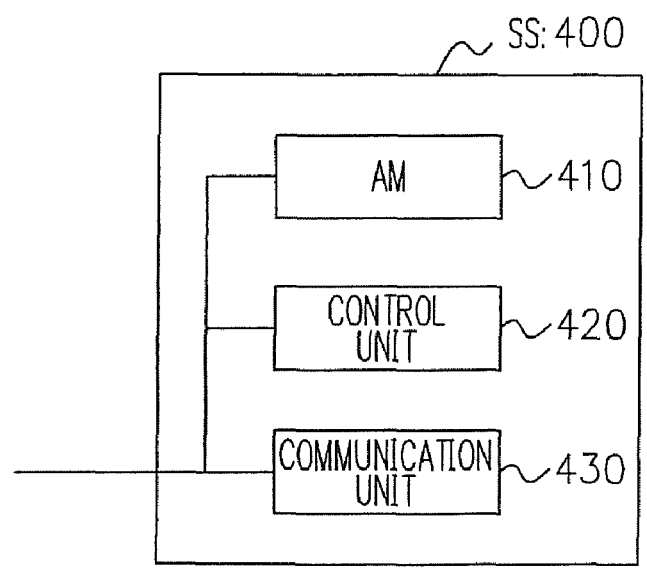
FIG. 12 is a block diagram of a configuration example of an SS 400.

As shown in FIG. 12, the SS 400 comprises an AM (allocating means) 410 described above, a control unit 420 that performs control of the entire device such as control of communication with the OLT, and a communication unit 430 that is a communication IF (interface). The bandwidth transmitting means is realized by the control unit 420 and the communication unit 430.

Each allocation module (AM1 to AM9) of each SS includes a function of executing bandwidth allocation of the SS based on a buffer queue status (length of queue) of each connection within the own module and bandwidth allocation results of other SSs notified from the OLT. The bandwidth allocation result transmitted from each SS includes time of the start of signal of each connection arriving at the OLT as a PON frame and duration time.

The AM1 to AM9 are allocation modules including a function of executing bandwidth allocation by pipeline processing based on allocation information of other SSs notified through the OLT. More specifically, each of the AM1 to AM9 receives a queue status of respective SS1 to SS9 and an allocation result from the module of the previous SS through the OLT and the ONU-BS and transmits an allocation result to the module of the next SS. Each SS transmits an uplink signal based on completed allocation. The ONU-BSs encapsulate the uplink signals of WiMAX by PON frames and transmit the signals to the OLT.

Operations of the exemplary embodiment will now be described.

Once again, a cycle in which data transmissions by all SSs are performed will be defined as a service cycle (abbreviated as SC). In the present invention, bandwidth allocation of the next SC is performed within the period of the current SC.

FIGS. 13 to 21 show operations of bandwidth allocation in the configuration of FIG. 10.

The results of time matching and distance (propagation delay time) measurement performed among the OLT, the ONU-BSs, and the SSs upon system startup are notified to the ONU-BSs and the SSs and stored in a memory. Therefore, each AM can calculate the arrival time of the start of signal to the OLT in the bandwidth allocation.

Each SS recognizes of the unit number of the own, i.e. where in the pipeline processing the SS is located, by notification from the OLT. In the present example, the bandwidth allocation is performed for each connection of the SSs.

The total maximum bandwidth of the SC (Maximum of Service Cycle) and the maximum bandwidth of the SSs are determined in advance, and the SSs prevent the total allocation from exceeding the maximum when the bandwidth is allocated. The total maximum bandwidth of each SS is not necessarily equal to or below the total maximum bandwidth of the SC.

The AM1 performs allocation in an SC2 related to the SS1 based on the queue status of the connection of the AM1. At this time, the AM1 performs allocation so that all signals accumulated in the queue of the AM1 can be transmitted if the signals fall within the range of the Maximum of Service Cycle and the maximum bandwidth of the AM1. The AM1 notifies the result to the ONU-BS in a bandwidth request frame format (6 bytes) of WiMAX.

Figure 22:
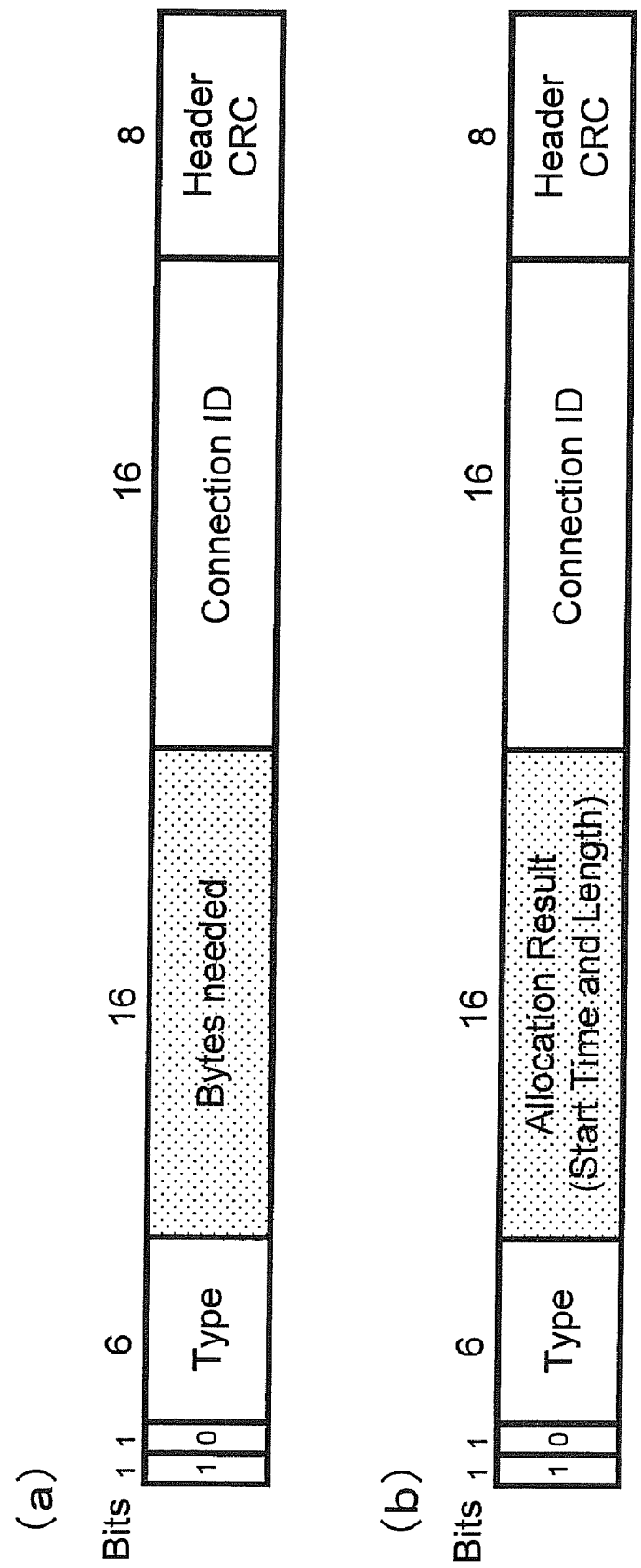
FIG. 22(A) shows a frame configuration of a bandwidth request frame in general WiMAX.
FIG. 22(B) shows a frame configuration of a bandwidth request frame of WiMAX in the exemplary embodiment.

FIG. 22 shows frame configurations of a bandwidth request frame of WiMAX. FIG. 22(A) shows the bandwidth request frame of WiMAX. FIG. 22(B) shows a frame format adjusted for allocation result notification used in the exemplary embodiment. One frame can notify 2 bytes of information related to the allocation result.

Figure 23:
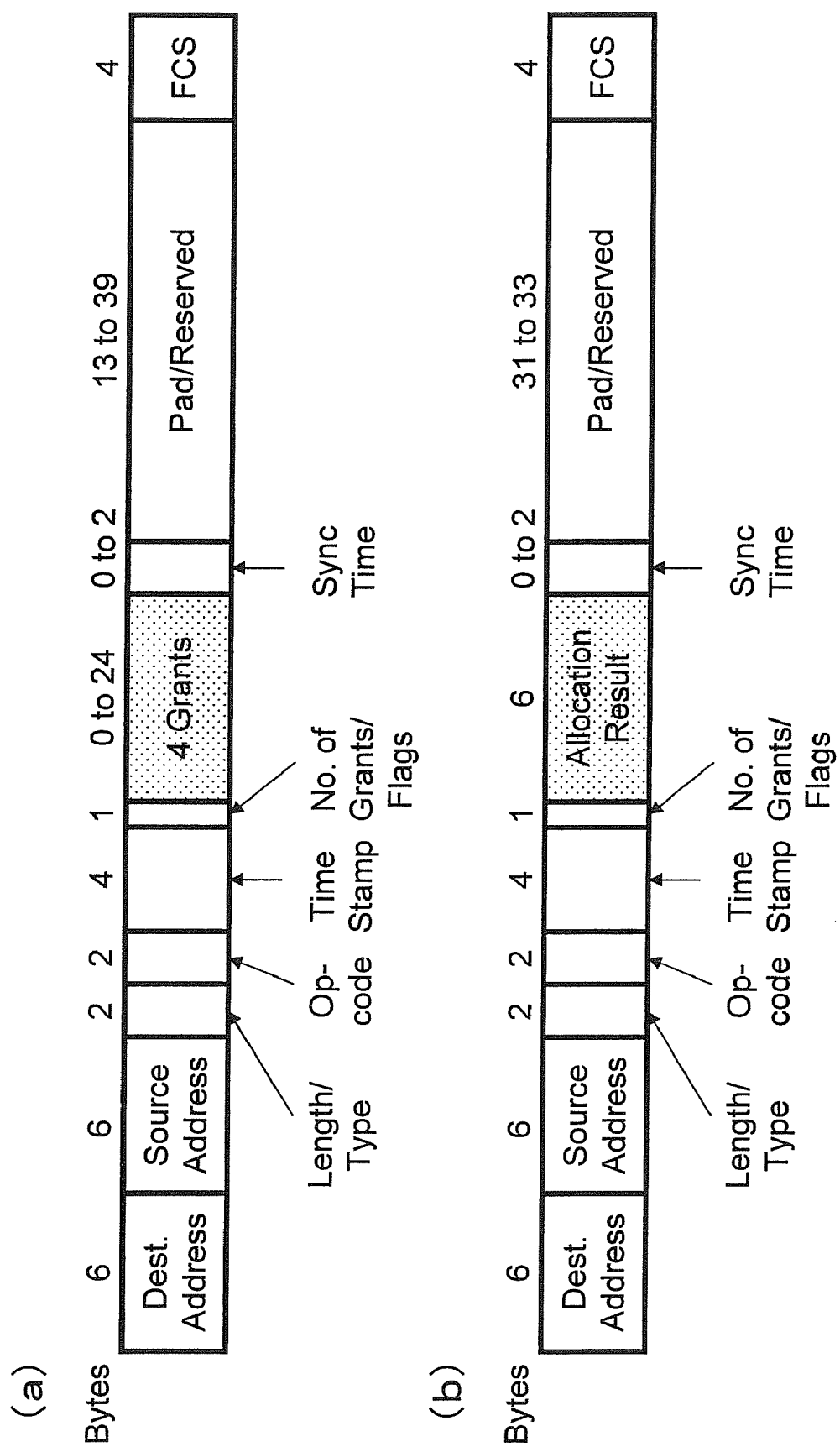
FIG. 23(A) shows a frame configuration of a general GATE frame.
FIG. 23(B) shows a frame configuration of a GATE frame in the exemplary embodiment.

As shown in FIG. 23(A), the uplink allocation result (GATE frame) of EPON requires 6 bytes for one ONU. Therefore, each SS expresses the uplink allocation result of the SS in a form of an allocation result of PON and transmits the information to the ONU-BS after storing the information in three frames for allocation result notification. The allocation result frames include arrival time of signal to the OLT and signal duration time. The arrival time to the OLT is calculated from propagation delay time from the OLT to the SS1 notified upon startup. The ONU-BS immediately encapsulates the times into REPORT frames of PON and transmits the times to the OLT.

Figure 24:
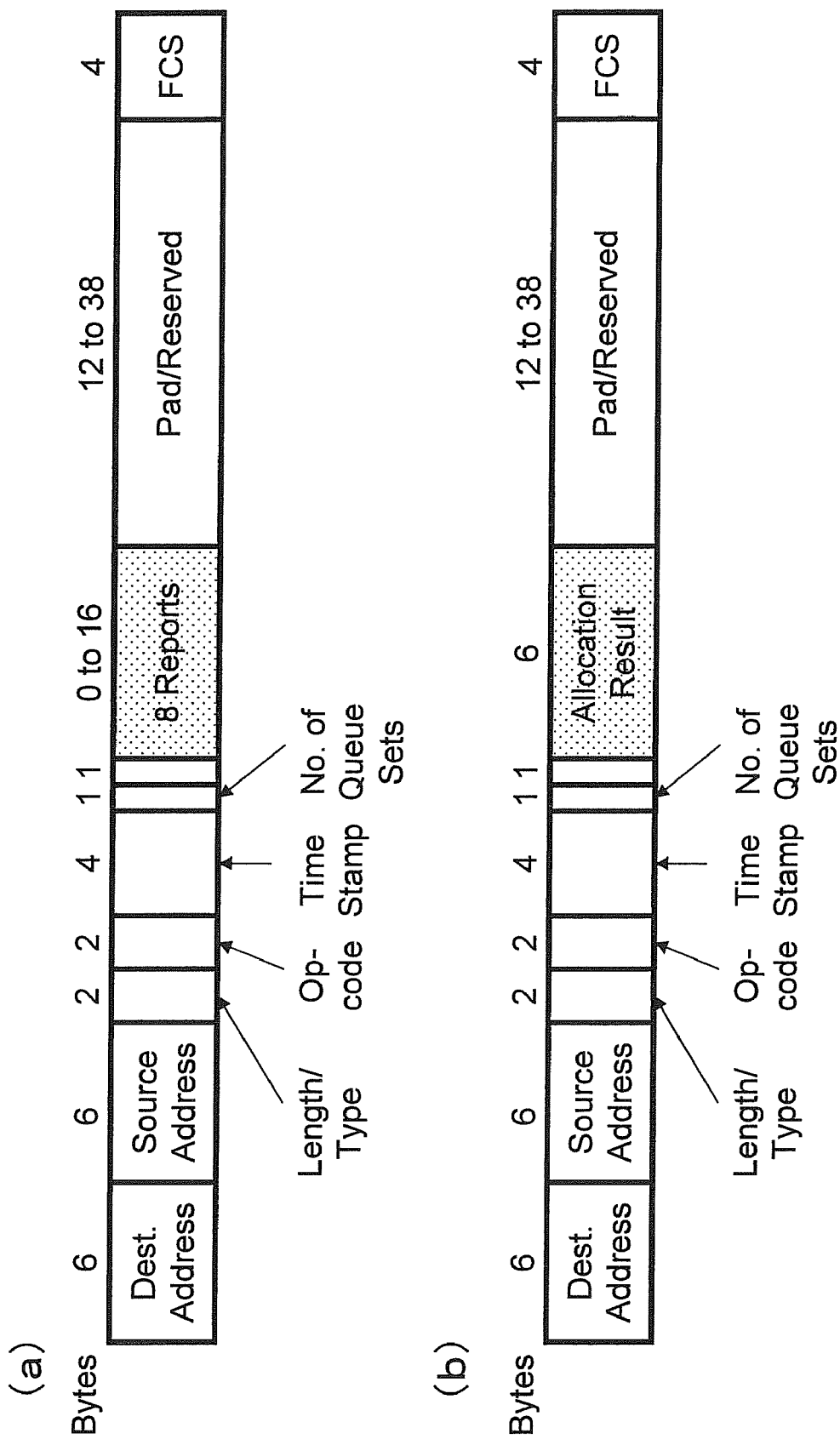
FIG. 24(A) shows a frame configuration of a general REPORT frame.
FIG. 24(B) shows a frame configuration of a REPORT frame in the exemplary embodiment.

A PDU of the REPORT frame is 16 bytes at the maximum and can include a bandwidth request frame (6 bytes) of WiMAX. FIG. 24 shows REPORT frames of PON. FIG. 24(A) shows a bandwidth request frame of PON. FIG. 24(B) shows a frame format adjusted for allocation result notification used in the exemplary embodiment.

Figure 13:
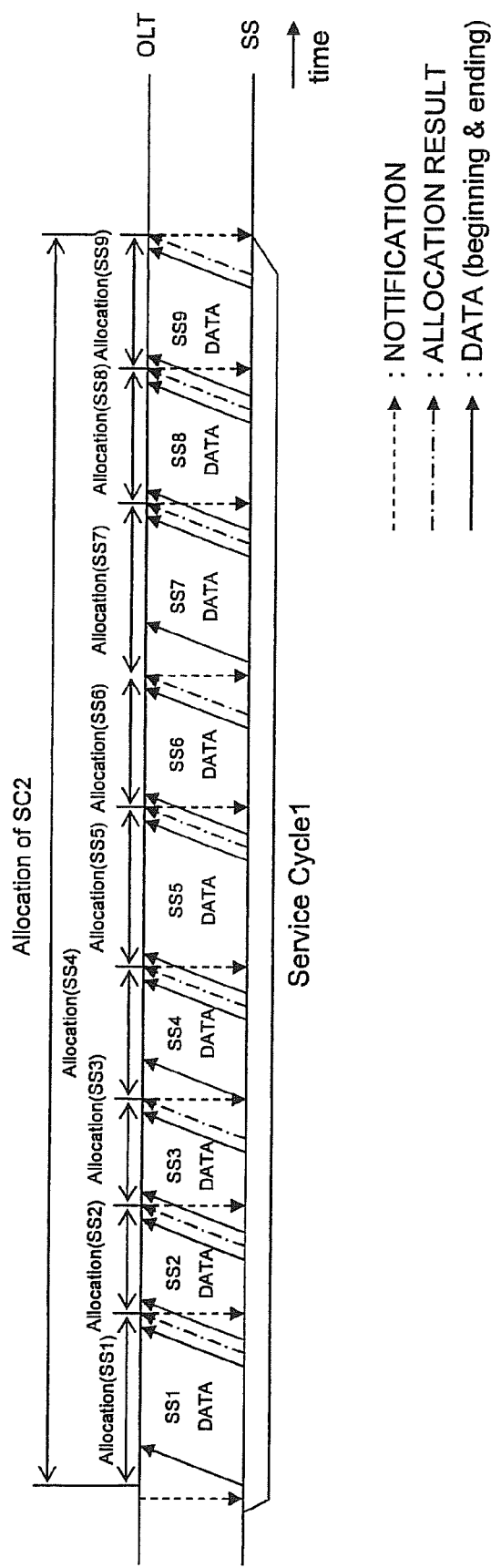
FIG. 13 shows an operation example of an SC1 in bandwidth allocation in the exemplary embodiment.

The OLT immediately notifies the allocation result of the SS1 to all SSs as a downlink signal through the ONU-BSs. The notification signal will be called a "Notification". The ONU-BSs remove the capsule of the encapsulated notification signal to form the frame configuration of WiMAX and transmit the signal to the SSs. FIG. 23(B) shows Notification frame in which the GATE frame of PON shown in FIG. 23(A) is adjusted. Allocation (SS1) of FIG. 13 shows time of the operation so far.

The AM2 of the SS2 performs allocation in the SC2 related to the SS2 based on notification information (bandwidth allocation information of the SS1 that has performed the bandwidth allocation before this one) from the OLT and the queue status of the AM2. The information from the OLT includes time that the start of signal of the ONU1 arrives at the OLT and duration time of the signal. Therefore, the SS2 determines signal transmission start time that can avoid collision. At this time, the SS2 uses propagation delay time between the OLT and the SS2 notified upon the startup to calculate the time.

Figure 14:
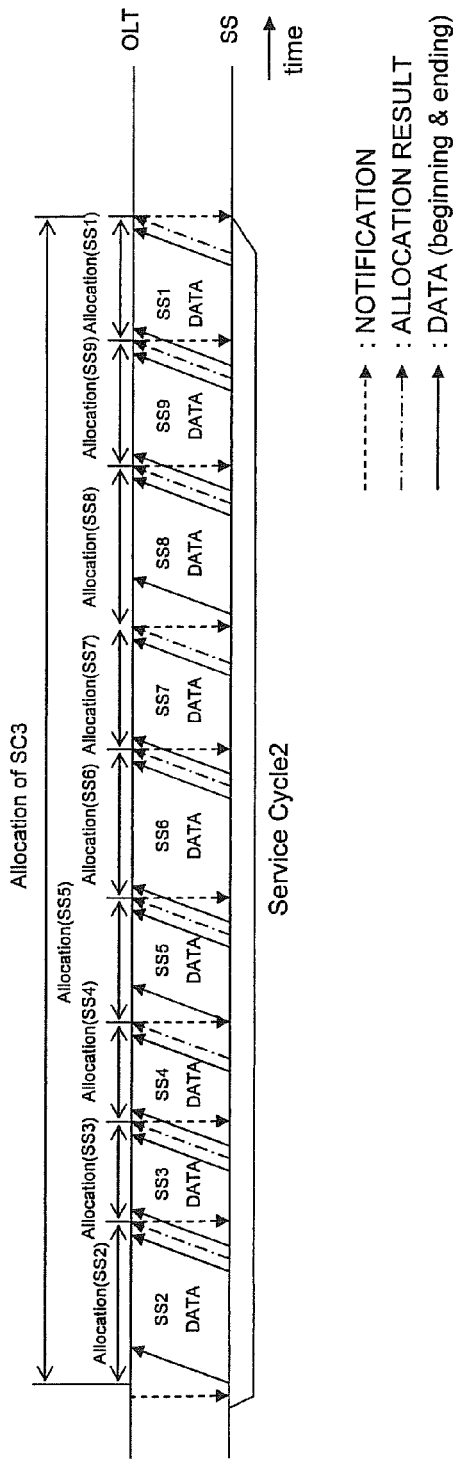
FIG. 14 shows an operation example of an SC2 in bandwidth allocation in the exemplary embodiment.
Figure 15:
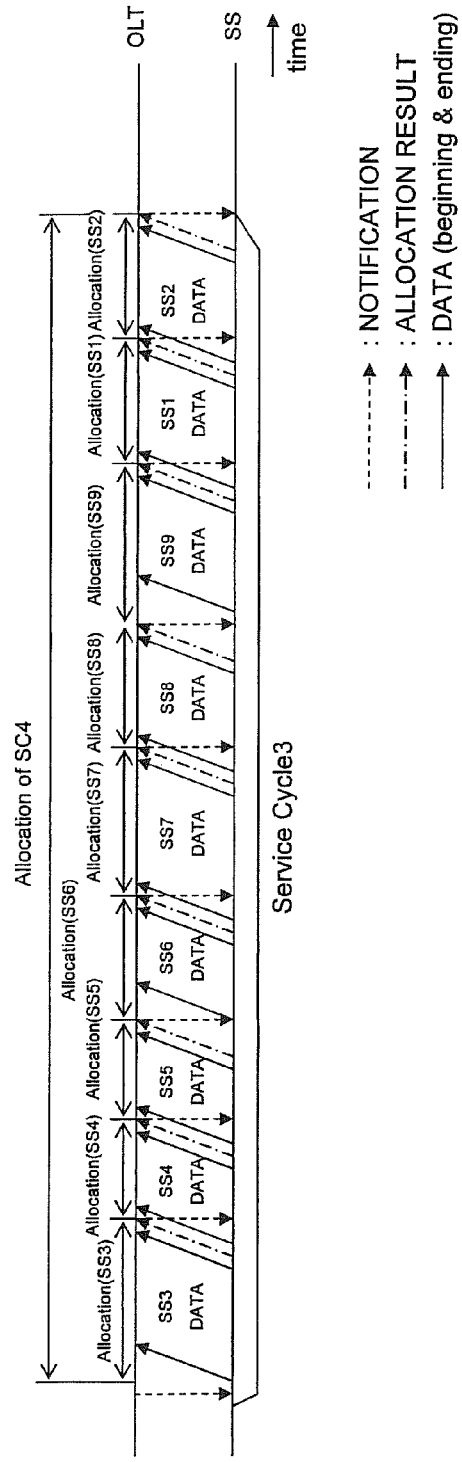
FIG. 15 shows an operation example of an SC3 in bandwidth allocation in the exemplary embodiment.
Figure 20:
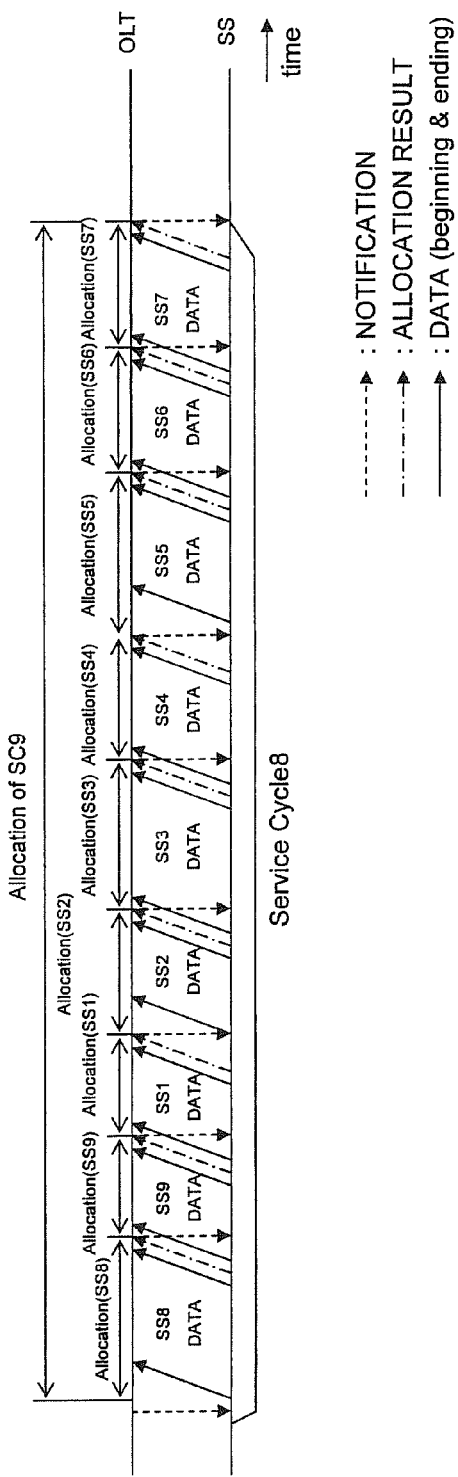
FIG. 20 shows an operation example of an SC8 in bandwidth allocation in the exemplary embodiment.
Figure 21:
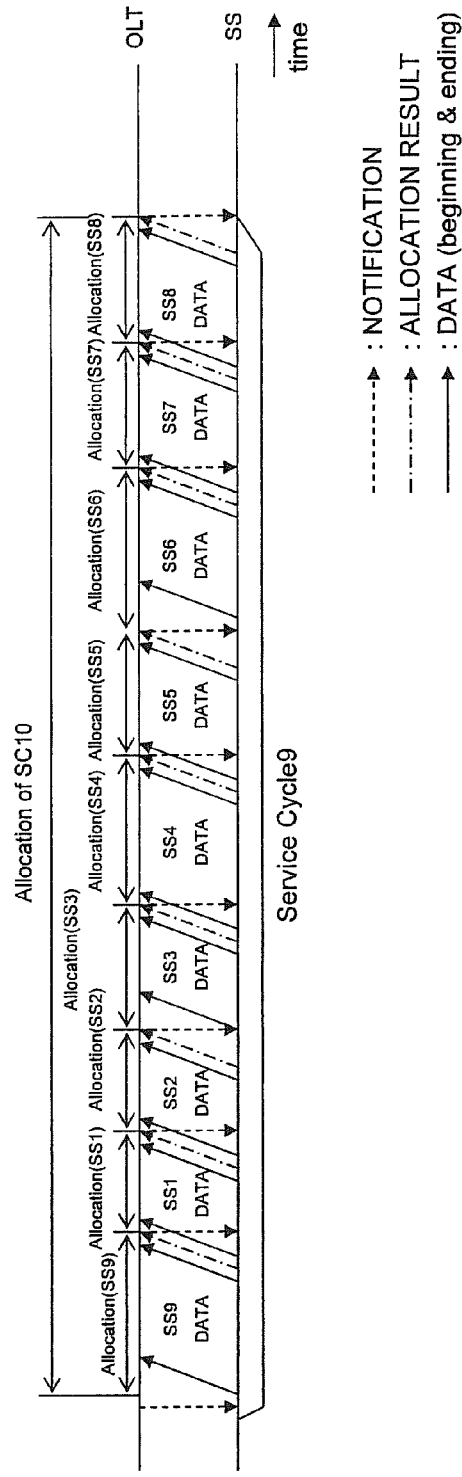
FIG. 21 shows an operation example of an SC9 in bandwidth allocation in the exemplary embodiment.

The AM2 notifies the allocation result to the OLT through the ONU-BS, and the result is again notified to all SSs by downlink signals. Allocation (SS2) of FIG. 14 shows time of the operation so far.

In a similar way, each of the AM3 to AM9 performs allocation in the SC2 related to the respective SS based on the result handed over from the previous AM through the OLT and the ONU-BS and the queue status of the own AM. At this time, the SSs perform allocation without exceeding the preset maximum bandwidth and the total bandwidth of the SC. The allocation in the SC2 is completed after the allocation by the AM9, and the allocation result is handed over from the AM9 to the OLT and notified again to all SSs.

Similarly, allocation in an SC3 is performed in the order of AM2→AM3→AM4→ . . . →AM9→AM1, and the result is shared by all SSs. Allocation in an SC4 is performed in the order of AM3→AM4→AM5→ . . . →AM9→AM1→AM2, and the result is shared by all ONUs. Subsequently, allocations are performed in a similar way, and the allocation in an SC10 is performed in the order of AM9→AM1→AM2→ . . . →AM8.

As the start modules of allocations are cyclically changed depending on the SC, the communication system of the exemplary embodiment also cyclically changes the order of data transmissions from the SSs. More specifically, the data is transmitted in the orders of SS1→SS2→ . . . →SS9 in the SC2, SS2→SS3→ . . . →SS9→SS1 in the SC3, and SS3→SS4→ . . . →SS9→SS1→SS2 in the SC4. The same applies to the following SCs.

Since the allocation results from the SSs are piggy backed to the uplink data of PON, the allocation results from the SSs arrive at the OLT in the same order as the data. The fairness among the SSs is maintained by cyclically changing the start modules of allocation.

Figure 25:
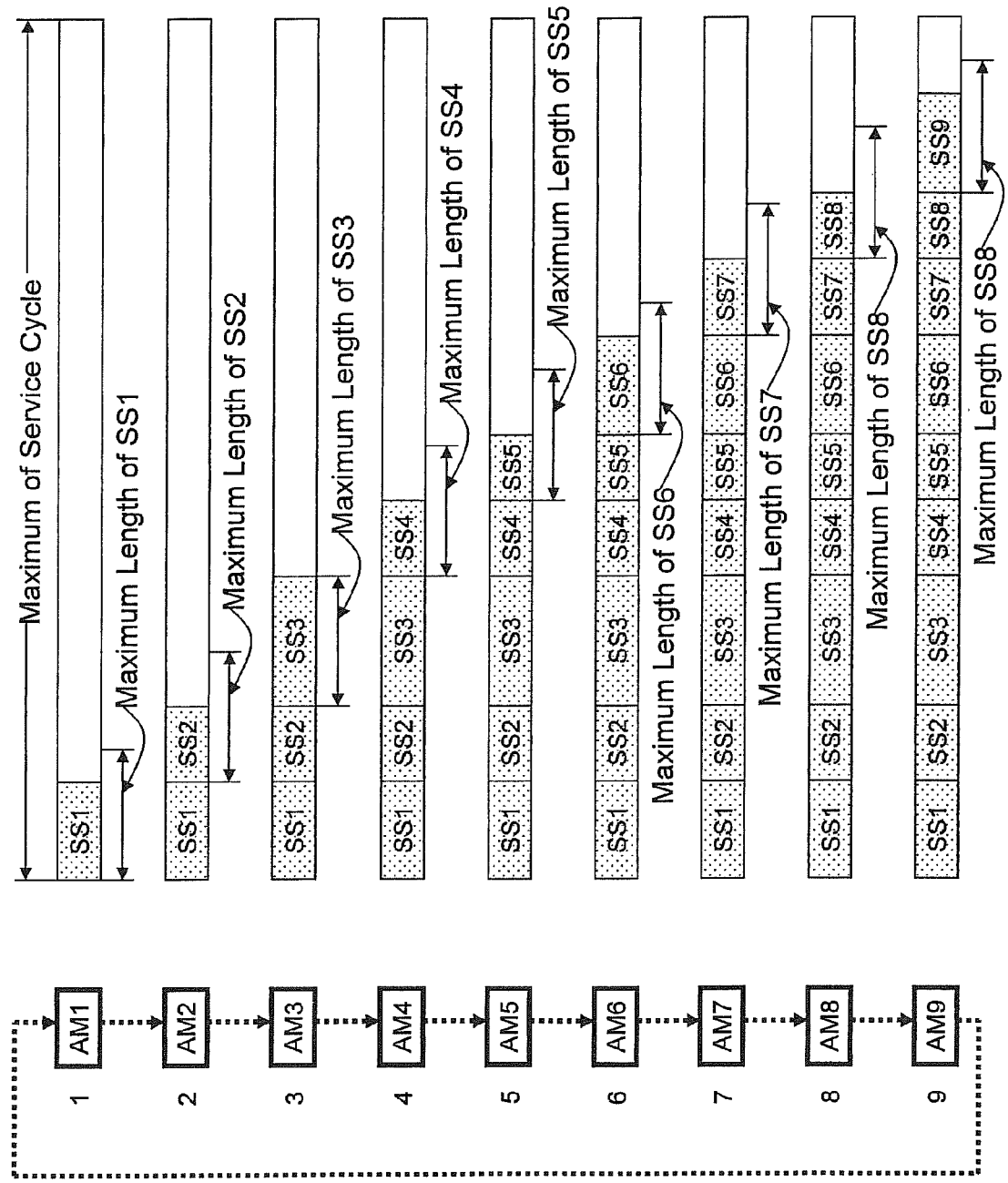
FIG. 25 shows an example of bandwidth allocation in the SC1 in time series.
Figure 26:
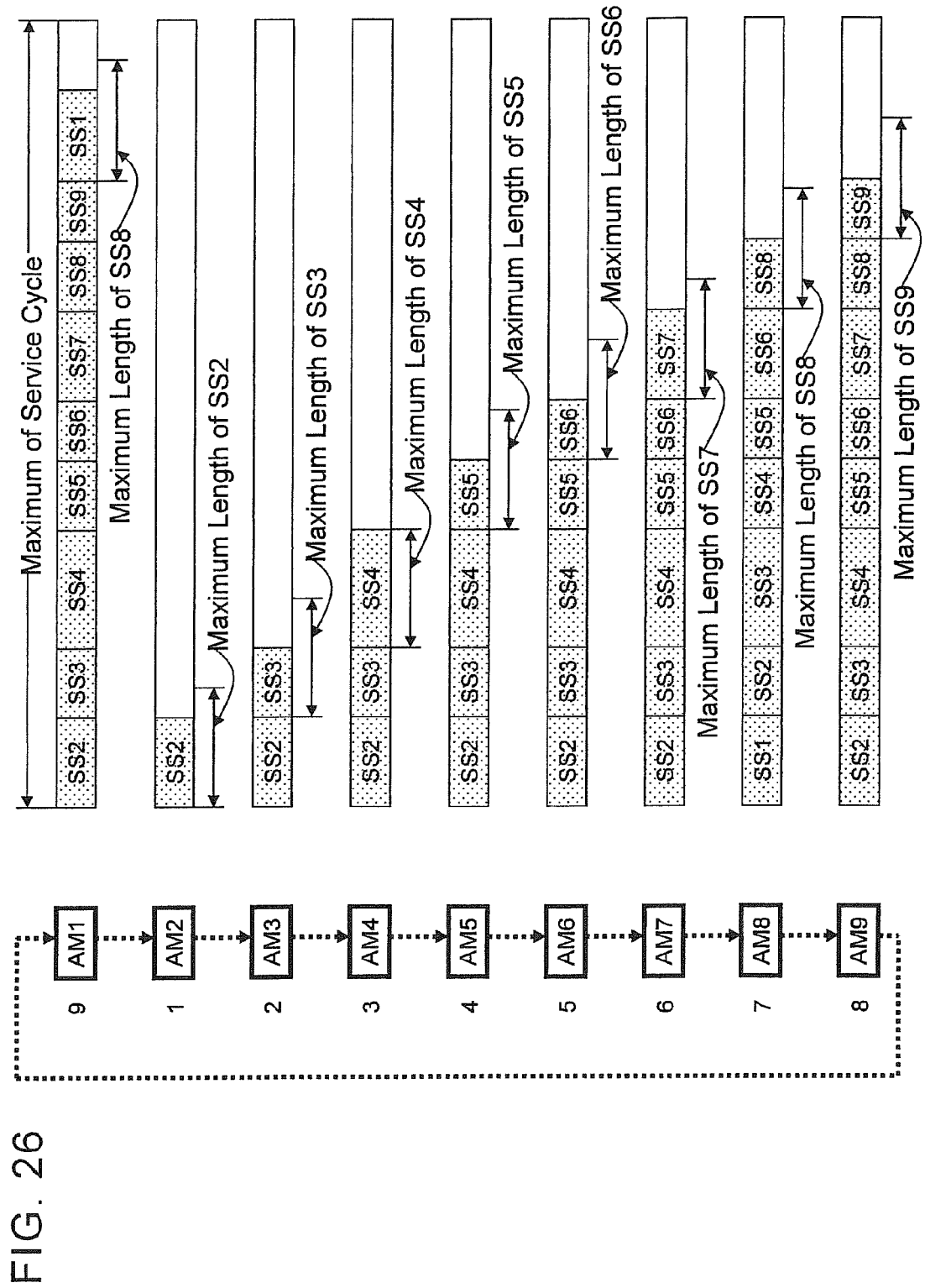
FIG. 26 shows an example of bandwidth allocation in the SC2 in time series.
Figure 27:
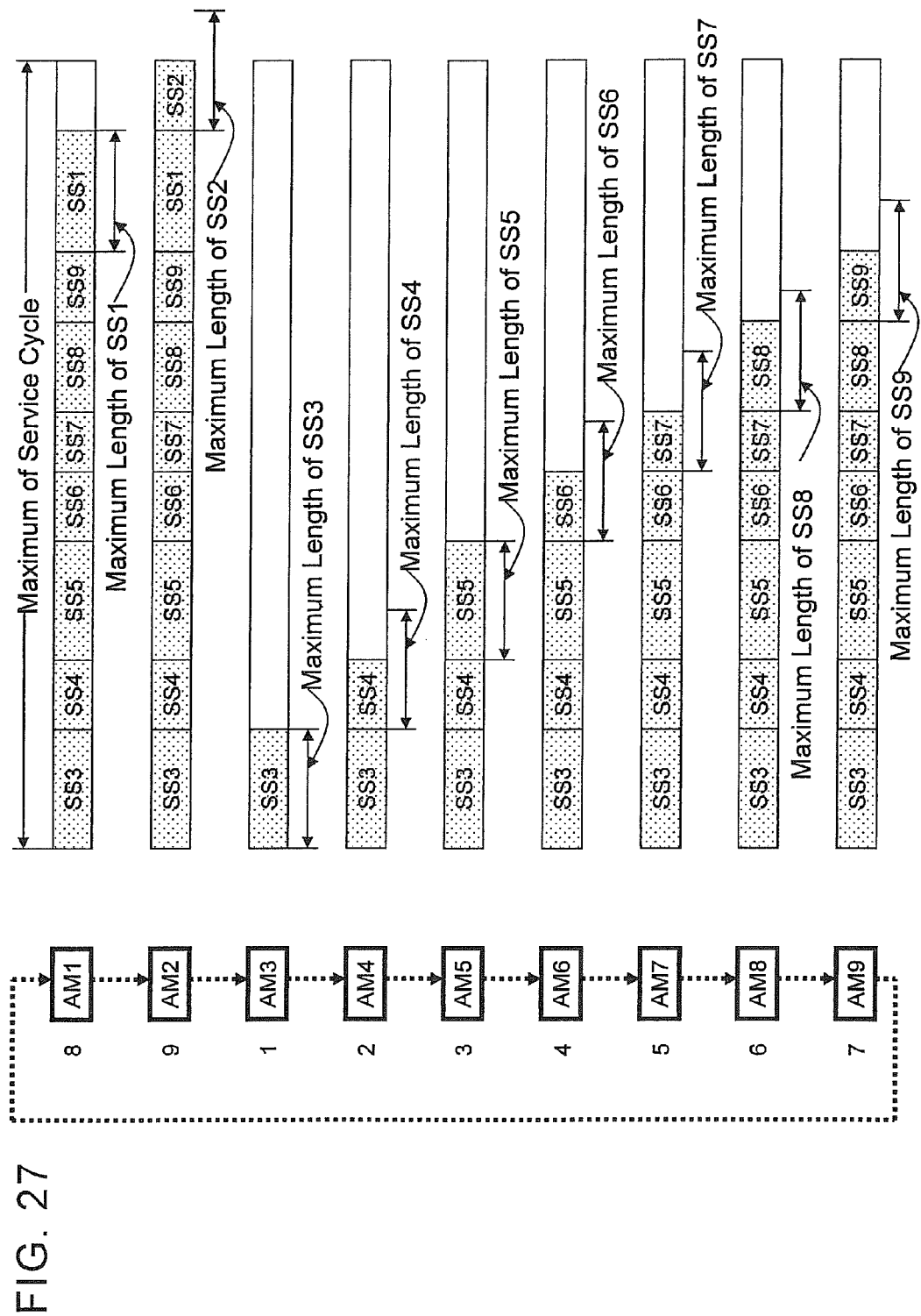
FIG. 27 shows an example of bandwidth allocation in the SC3 in time series.
Figure 28:
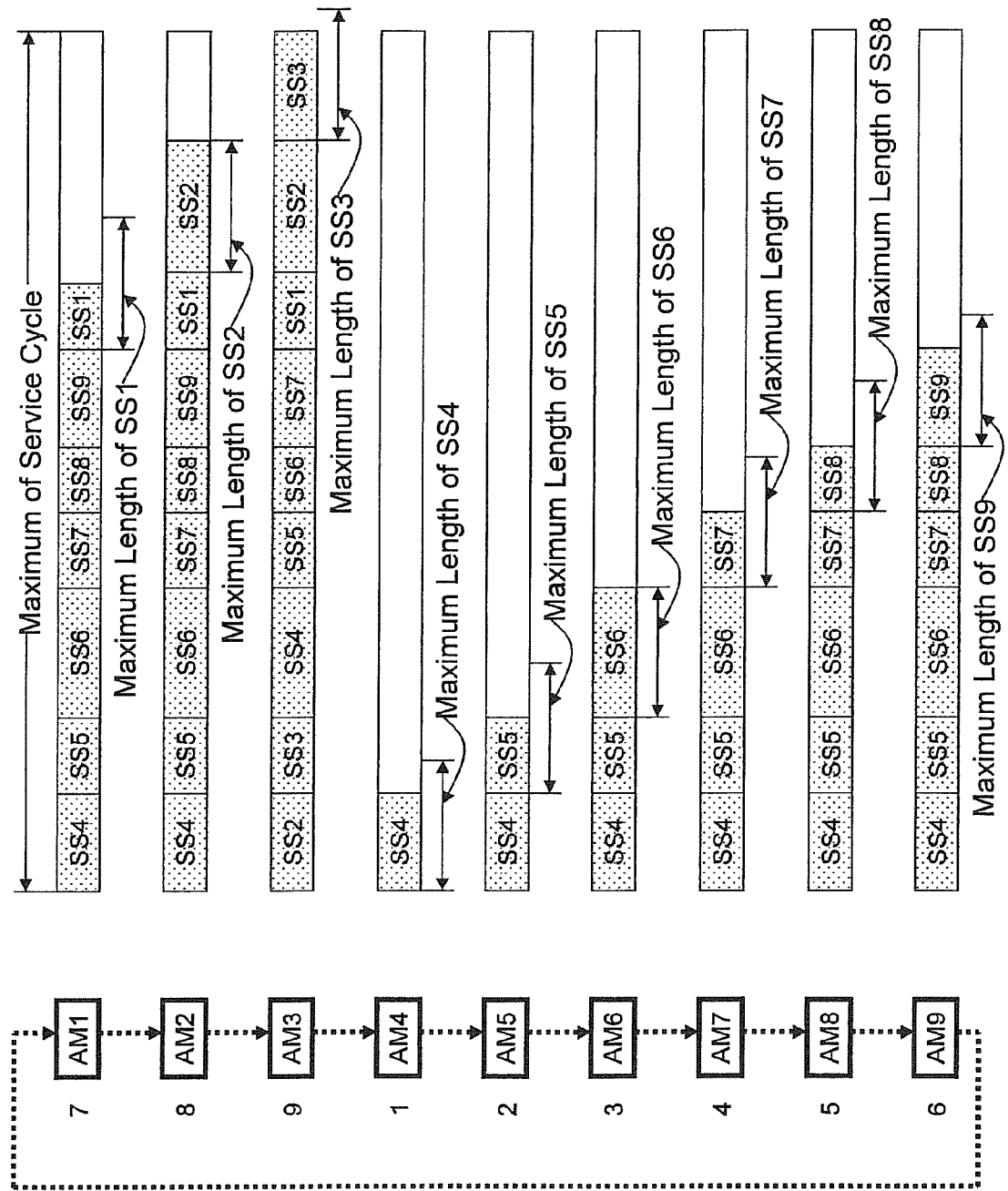
FIG. 28 shows an example of bandwidth allocation in the SC4 in time series.
Figure 29:
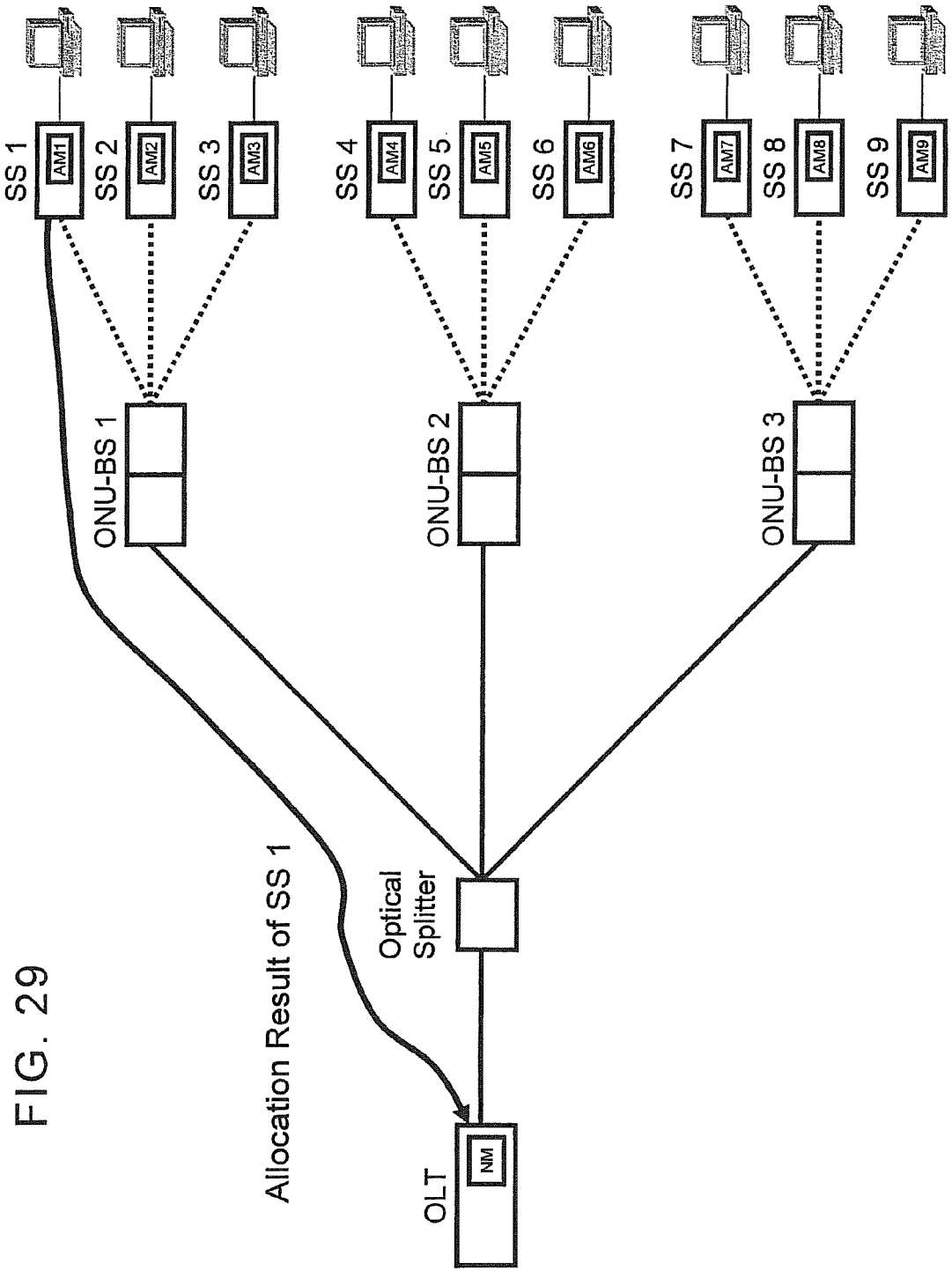
FIG. 29 shows an operation example of allocation result notification from the SS.
Figure 30:
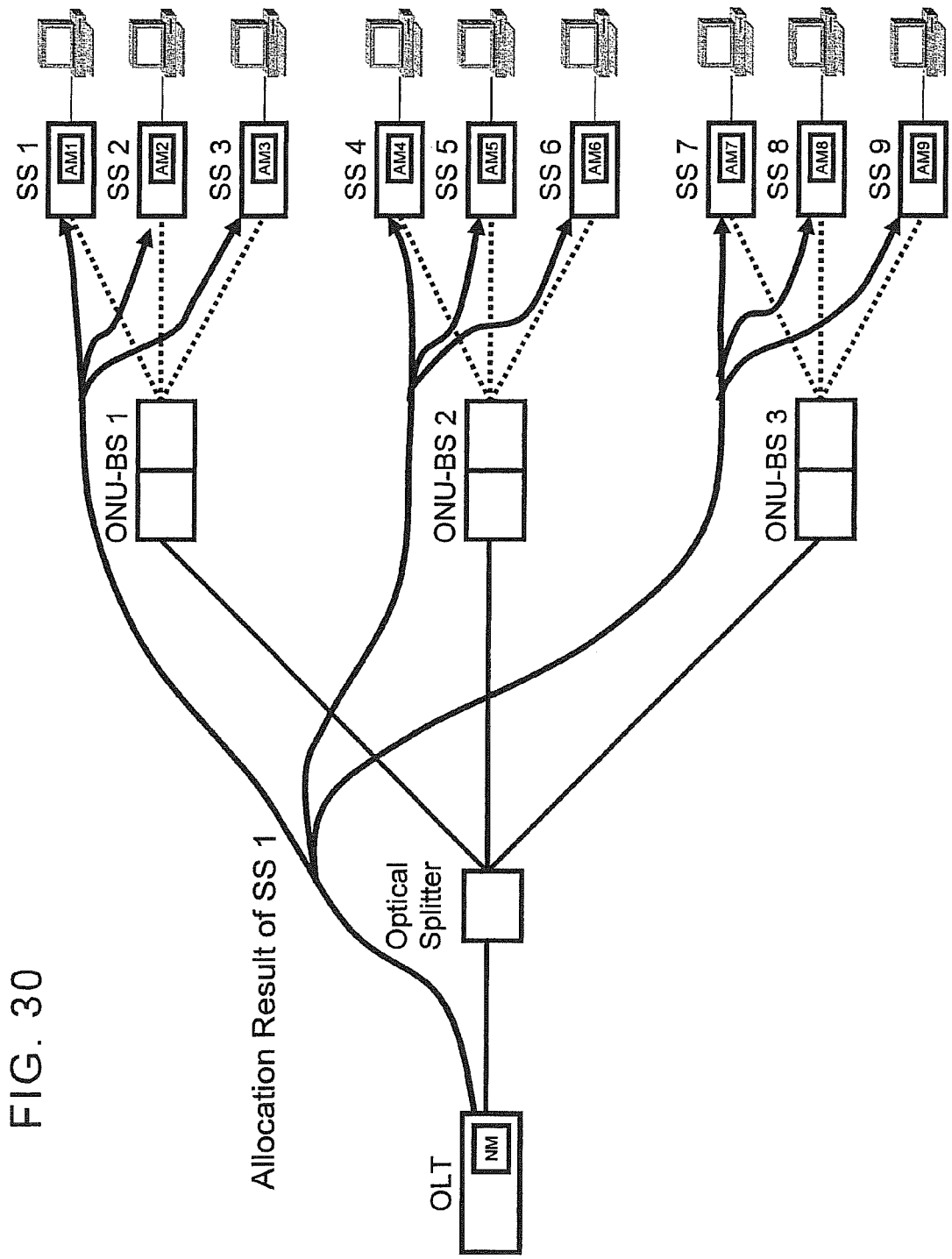
FIG. 30 shows an operation example of simultaneous notification to all SSs by the OLT.

FIGS. 25 to 28 shows operation examples of the allocations from the SC2 to SC4. In FIGS. 25 and 26, the allocation requests of all SSs are reflected on the result because the bandwidth requests of all SSs are below the total maximum bandwidth. FIG. 27 shows a situation in which the allocation of the SS2 is limited by the limit of the total maximum bandwidth. FIG. 28 similarly shows a situation in which the allocation by the SS3 is limited. FIGS. 29 and 30 show situations of allocation result notification from the SSs and simultaneous notification to all SSs by the OLT.

In this way, the AM of the SS that first determines the bandwidth allocation in the SC determines the bandwidth allocation to transmit the queue to be transmitted in the AM within the range of the maximum bandwidth preset for the SS when performing the bandwidth allocation in the next SC. The AM then notifies the determined bandwidth allocation information to the OLT 100 as a Report.

The AM of the SS that is not first in the order for determining the bandwidth allocation in the SC uses the notification information (bandwidth allocation information of the SS that has performed the previous bandwidth allocation) from the OLT 100 when performing the bandwidth allocation in the next SC, and if the queue to be transmitted in the AM can be allocated within the range of the maximum bandwidth preset for the SS, the AM performs the bandwidth allocation in this way.

The AM of the SS that is not first in the order for determining the bandwidth allocation in the SC performs the bandwidth allocation for an amount that can be allocated if the queue to be transmitted in the AM cannot be allocated within the range of the maximum bandwidth preset for the SS.

According to the exemplary embodiment, the following advantages can be obtained.

Figure 31:
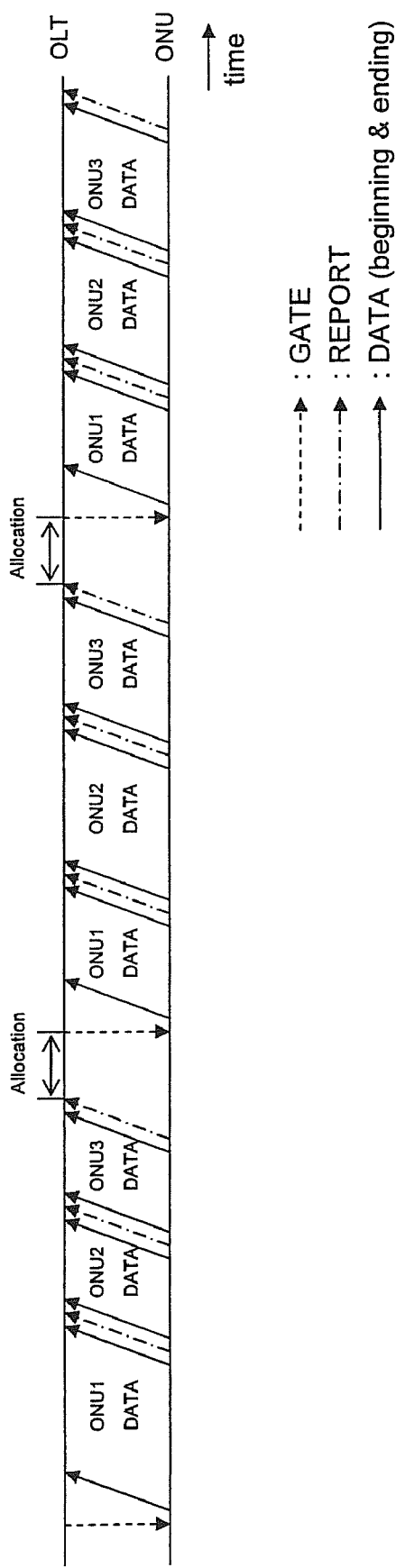
FIG. 31 shows an operation example of bandwidth allocation in a related art.

Compared to the conventional example that performs allocation after all allocation requests have arrived at the OLT and the ONU-BSs, the bandwidth is not wasted in the bandwidth allocation method of the present invention because the allocation process is sequentially advanced using the uplink data reception time. This is apparent by comparing a timing chart of the conventional example in FIG. 31 and timing charts of the present invention in FIGS. 13 to 21.

Moreover, the fairness among the ONUs can be maintained by cyclically changing the allocation order of bandwidth. The load of the control unit is not significantly increased even if the number of SSs or ONUs is increased, because a processing time is enough due to the distributed processing. The control unit can be constituted by inexpensive circuit elements or CPUs so that the cost of the system can be reduced. Since the distal SSs directly perform the allocation, accurate allocation is possible.

In this way, the exemplary embodiment can provide a bandwidth allocation method capable of maintaining the fairness of the uplink bandwidth among the distal SSs, accurately reflecting the allocation requests, improving the bandwidth use efficiency, and providing high scalability.

The exemplary embodiments described above are preferred embodiments of the present invention, and the present invention is not limited by these. Various modifications can be implemented based on the technical concept of the present invention.

For example, the above exemplary embodiments have illustrated an example of allocation to nine SSs. The exemplary embodiment can also be applied in a similar way even if the number of SSs is increased to N (N is a natural number) in general. In that case, N AMs are virtually connected in a ring shape to execute the pipeline processing.

Although an allocation based on the priorities is not described in the above exemplary embodiments, the priorities can be provided to the connections of the SSs, and all SSs share the information so that the allocation can be performed based on the priorities. When the AM of the SS that is not first in the order for determining the bandwidth allocation in the performs the bandwidth allocation in the case where the priorities are associated with the bandwidth allocation to the connections of the SSs, the bandwidth allocation is changed so that the allocation to a subscriber station with higher priority is prioritized over the allocation data to a subscriber station with lower priority if the queue to be transmitted in the AM cannot be allocated within the range of the maximum bandwidth preset for the SS.

Although EPON is used to describe the exemplary embodiments, the system of the exemplary embodiment can also be applied to other PON systems such as GPON and BPON.

In this way, the above exemplary embodiments provide, in the uplink bandwidth allocation in the network integrating the PON and WiMAX including N SSs, a method of executing pipeline processing of bandwidth allocation by N allocation modules mounted on the SSs.

The above exemplary embodiments also provide a method for the SSs to recognize allocation results of other SSs through the ONU-BSs and the OLT and a method of cyclically changing the allocation order.

The above exemplary embodiments further provide a method of executing the allocation process of the next service cycle by dispersing the process into the current service cycle.

The above exemplary embodiments further provide a method of setting a bandwidth upper limit of each service cycle and a bandwidth upper limit of each SS.

The above exemplary embodiments further provide a method of transmitting the allocation results of the SSs across the PON using an allocation request format (REPORT) of PON to notify the OLT.

The above exemplary embodiments also provide a method of transmitting the allocation results across the PON using an allocation enable format (GATE) of PON to further notify all SSs.

The above exemplary embodiments further provide a configuration for mounting the uplink queue buffers only on the SSs.

Recording the procedure that realized the communication system, the optical line terminator, and the subscriber station in the exemplary embodiments in a recording medium as a program can realize the functions of the exemplary embodiments of the present invention by causing a CPU of a computer constituting a system to execute the processes by the program supplied from the recording medium. In that case, the present invention is applied in the case where an information group including the program is supplied to an output device from the recording medium or an external recording medium through the network.

Thus, the program code read out from the recording medium realizes novel functions of the present invention, and the recording medium recording the program code and the signals read out from the recording medium constitute the present invention. For example, a flexible disk, a hard disk, an optical disk, a magneto-optical disk, a CD-ROM, a CD-R, a CD-RW, a DVD-ROM, a DVD-RAM, a DVD-RW, a DVD+RW, a magnetic tape, a nonvolatile memory card, or a ROM can be used as the recording medium.

According to the recording medium recording the program of the present invention, the functions in the above exemplary embodiments can be realized in the devices controlled by the program.

As described, the present invention can accurately reflect allocation requests and increase the bandwidth use efficiency without requiring expensive and fast integrated circuits or CPUs in the control circuit even in a large-scale system with a large number of terminal devices.

What is claimed is:

1. A bandwidth allocation method comprising:
an allocating step for a subscriber station to determine bandwidth allocation based on a predetermined allocation condition;
a bandwidth transmitting step for the subscriber station to transmit bandwidth allocation information determined in the allocating step to an optical line terminator; and
a pipeline transmitting step for the optical line terminator to transmit the bandwidth allocation information transmitted from the subscriber station to all subscriber stations to be allocated with bandwidth,
wherein:
the subscriber station transmits the bandwidth allocation information along with transmission data in the allocated bandwidth to the optical line terminator,
bandwidth allocation in a next service cycle is determined during a service cycle in which data transmissions by all subscriber stations to be allocated with bandwidth are performed, and
in the subscriber stations to be allocated with bandwidth, an order for setting the subscriber station in which the bandwidth allocation is determined in the allocating step is sequentially shifted in each service cycle.

2. A bandwidth allocation method comprising:
an allocating step for a subscriber station to determine bandwidth allocation based on a predetermined allocation condition;
a bandwidth transmitting step for the subscriber station to transmit bandwidth allocation information determined in the allocating step to an optical line terminator; and
a pipeline transmitting step for the optical line terminator to transmit the bandwidth allocation information transmitted from the subscriber station to all subscriber stations to be allocated with bandwidth,
wherein:
the subscriber station transmits the bandwidth allocation information along with transmission data in the allocated bandwidth to the optical line terminator,
bandwidth allocation in a next service cycle is determined during a service cycle in which data transmissions by all subscriber stations to be allocated with bandwidth are performed, and
the subscriber station not first in the order for determining the bandwidth allocation in the service cycle in the allocating step uses, in the allocating step, the bandwidth allocation information transmitted in the pipeline transmitting step to:
perform the allocation if the queue to be transmitted in the subscriber station can be allocated within the range of the maximum bandwidth preset for the subscriber station, and
perform allocation for an amount that can be allocated if the queue to be transmitted in the subscriber station cannot be allocated within the range of the maximum bandwidth preset for the subscriber station.

3. The bandwidth allocation method according to claim 2, wherein:
priorities are associated with the allocations in the subscriber stations to be allocated with bandwidth, and
the subscriber stations not first in the order change the bandwidth allocation so that allocation to a subscriber station with higher priority is prioritized over allocation data to a subscriber station with lower priority when the allocations are impossible.

4. A subscriber station comprising:
an allocating unit that determines bandwidth allocation based on a predetermined allocation condition; and
a bandwidth transmitting unit that transmits bandwidth allocation information determined by the allocating unit to an optical line terminator,
wherein:
the bandwidth transmitting unit transmits the bandwidth allocation information along with transmission data in the allocated bandwidth to an optical line terminator,
bandwidth allocation in a next service cycle in a communication system is determined during a service cycle in which data transmissions by all subscriber stations to be allocated with bandwidth in the communication system connected with the subscriber station are performed, and
in the subscriber stations to be allocated with bandwidth, an order for setting the subscriber station in which the bandwidth allocation is determined by the allocating unit is sequentially shifted in each service cycle.

5. A subscriber station comprising:
an allocating unit that determines bandwidth allocation based on a predetermined allocation condition; and
a bandwidth transmitting unit that transmits bandwidth allocation information determined by the allocating unit to an optical line terminator,
wherein:
the bandwidth transmitting unit transmits the bandwidth allocation information along with transmission data in the allocated bandwidth to an optical line terminator,
bandwidth allocation in a next service cycle in a communication system is determined during a service cycle in which data transmissions by all subscriber stations to be allocated with bandwidth in the communication system connected with the subscriber station are performed, and
when the subscriber station is not the subscriber station in which the bandwidth allocation is determined first in the service cycle, the allocating unit uses the bandwidth allocation information transmitted from the optical line terminator to:
perform the allocation if the queue to be transmitted in the subscriber station can be allocated within the range of the maximum bandwidth preset for the subscriber station, and
perform allocation for an amount that can be allocated if the queue to be transmitted in the subscriber station cannot be allocated within the range of the maximum bandwidth preset for the subscriber station.

6. The subscriber station according to claim 5, wherein:
priorities are associated with the allocations in the subscriber stations to be allocated with bandwidth, and
the allocating unit changes the bandwidth allocation so that allocation to a subscriber station with higher priority is prioritized over allocation data to a subscriber station with lower priority when the subscriber station is not the first in the order and the allocation is impossible.

7. A recording medium recording a program of a subscriber station, the program causing a computer of the subscriber station to execute:
an allocation process of determining bandwidth allocation based on a predetermined allocation condition; and
a bandwidth transmission process of transmitting bandwidth allocation information determined in the allocation process to an optical line terminator,
wherein:
in the bandwidth transmission process, the bandwidth allocation information is transmitted along with transmission data in the allocated bandwidth to the optical line terminator,
bandwidth allocation in a next service cycle in a communication system is determined during a service cycle in which data transmissions by all subscriber stations to be allocated with bandwidth in the communication system connected with the subscriber station are performed, and
in the subscriber stations to be allocated with bandwidth, an order for setting the subscriber station in which the bandwidth allocation is determined in the allocating process is sequentially shifted in each service cycle.

8. A recording medium recording a program of a subscriber station, the program causing a computer of the subscriber station to execute:
an allocation process of determining bandwidth allocation based on a predetermined allocation condition; and
a bandwidth transmission process of transmitting bandwidth allocation information determined in the allocation process to an optical line terminator,
wherein:
in the bandwidth transmission process, the bandwidth allocation information is transmitted along with transmission data in the allocated bandwidth to the optical line terminator,
bandwidth allocation in a next service cycle in a communication system is determined during a service cycle in which data transmissions by all subscriber stations to be allocated with bandwidth in the communication system connected with the subscriber station are performed, and in the allocation process, when the subscriber station is not the subscriber station in which the bandwidth allocation is determined first in the service cycle, bandwidth allocation information transmitted from the optical line terminator is used to:

perform the allocation if the queue to be transmitted in the subscriber station can be allocated within the range of the maximum bandwidth preset for the subscriber station, and perform allocation for an amount that can be allocated if the queue to be transmitted in the subscriber station cannot be allocated within the range of the maximum bandwidth preset for the subscriber station.

9. The recording medium recording a program of a subscriber station according to claim 8, wherein:

priorities are associated with the allocations in the subscriber stations to be allocated with bandwidth, and in the allocation process, the bandwidth allocation is changed so that allocation to a subscriber station with higher priority is prioritized over allocation data to a subscriber station with lower priority when the subscriber station is not the first in the order and the allocation is impossible.

* * * * *